US012652178B1

(12) United States Patent
Truskovsky et al.

(10) Patent No.: US 12,652,178 B1
(45) Date of Patent: Jun. 9, 2026

(54) INTERNET-OF-THINGS DEVICE COMMISSIONING SERVICE

(71) Applicant: Amazon Technologies, Inc., Seattle, WA (US)

(72) Inventors: Alexander Truskovsky, Waterloo (CA); Satyajeet Hoskote, Oak Hill, VA (US); Lukas Joseph Rash, Washington, DC (US); Leonid Wilde, Kirkland, WA (US); Keerthan Harish Vasist, Campbell, CA (US); Todd Cignetti, Ashburn, VA (US)

(73) Assignee: Amazon Technologies, Inc., Seattle, WA (US)

( * ) Notice: Subject to any disclaimer, the term of this patent is extended or adjusted under 35 U.S.C. 154(b) by 195 days.

(21) Appl. No.: 18/373,240

(22) Filed: Sep. 26, 2023

(51) Int. Cl.
*H04L 9/32* (2006.01)
*G06F 21/57* (2013.01)
*H04L 67/12* (2022.01)

(52) U.S. Cl.
CPC .......... *H04L 9/3268* (2013.01); *H04L 9/3247* (2013.01); *H04L 9/3265* (2013.01); *H04L 67/12* (2013.01)

(58) Field of Classification Search
None
See application file for complete search history.

(56) References Cited

U.S. PATENT DOCUMENTS

2019/0163912 A1* 5/2019 Kumar .................. H04L 9/0825
2019/0349426 A1* 11/2019 Smith .................. H04L 63/123
2020/0067915 A1* 2/2020 Kumar .................. H04L 9/0637
2021/0044441 A1* 2/2021 Nitschke ............... H04L 9/3297
2024/0243930 A1* 7/2024 Walther ................ H04L 9/3268
2025/0220403 A1* 7/2025 Smith .................... H04W 4/70

OTHER PUBLICATIONS

Connectivity Standards Alliance, Inc., “Matter Specification”, Version 1.1, May 17, 2023, 915 pages.

(Continued)

*Primary Examiner* — Christopher B Robinson
(74) *Attorney, Agent, or Firm* — Nicholson De Vos Webster & Elliott LLP

(57) ABSTRACT

Security workflows of a smart home connectivity protocol are integrated to establish device identities and ensure certification within a device commissioning service of a provider network. The service provider of the provider network can synchronize the commissioning service’s implementation of the protocol, relieving smart home device vendors of this responsibility. This streamlines the software complexity for vendors during device commissioning, removing their need for external data repositories or distributed networks. Some implementations feature a managed private certificate authority service in the provider network, issuing private certificates for validated device identification. This reduces cost and complexity for vendors, enabling them to focus on top-tier smart home solutions while relying on a secure, scalable provider network service for device commissioning. This approach also diminishes the necessity for individual public key infrastructure (PKI) management, enhancing efficiency and resource allocation.

20 Claims, 7 Drawing Sheets

(56) References Cited

OTHER PUBLICATIONS

Cooper et al., "Internet X.509 Public Key Infrastructure Certificate and Certificate Revocation List (CRL) Profile", Network Working Group, Request for Comments: 5280, May 2008, pp. 1-151.
Phillips et al., "Tags for Identifying Languages", Network Working Group, Request for Comments: 5646, Sep. 2009, pp. 1-84.

* cited by examiner

INTERNET-OF-THINGS DEVICE COMMISSIONING SERVICE

BACKGROUND

Standards exist to support seamless and secure cross-vendor connectivity for Internet of Things (IoT) devices, such as light switches, door locks, media devices, and other smart electronic devices. These standards ensure security and interoperability by enforcing device certification and authenticity checks before IoT devices can join a network and communicate with other devices on the network. One such standard is the "Matter smart home connectivity standard," authored by the Connectivity Security Alliance (CSA) trade association. The current version of the Matter standard is 1.1, published on May 18, 2023. More information about the Matter standard and the CSA can be found on the internet at /developer-resource/specifications-download-request/ within the csa-iot.org domain.

The process of adding an IoT device to a network, sometimes referred to as "commissioning," is complex, expensive, and time-consuming for IoT device vendors. Commissioning software typically runs on an administrator device that is on the network. The administrator device provides security and interoperability by identifying each IoT device and ensuring that only certified IoT devices can join the network. In some cases, the commissioning software performs complex cryptographic identity checks based on validating digital certificates. Additionally, in some cases, the commissioning software also verifies device attestation status by looking up the device certification information in a large, centralized data store.

BRIEF DESCRIPTION OF DRAWINGS

Various examples in accordance with the present disclosure will be described with reference to the drawings, in which.

DETAILED DESCRIPTION

Figure 1:
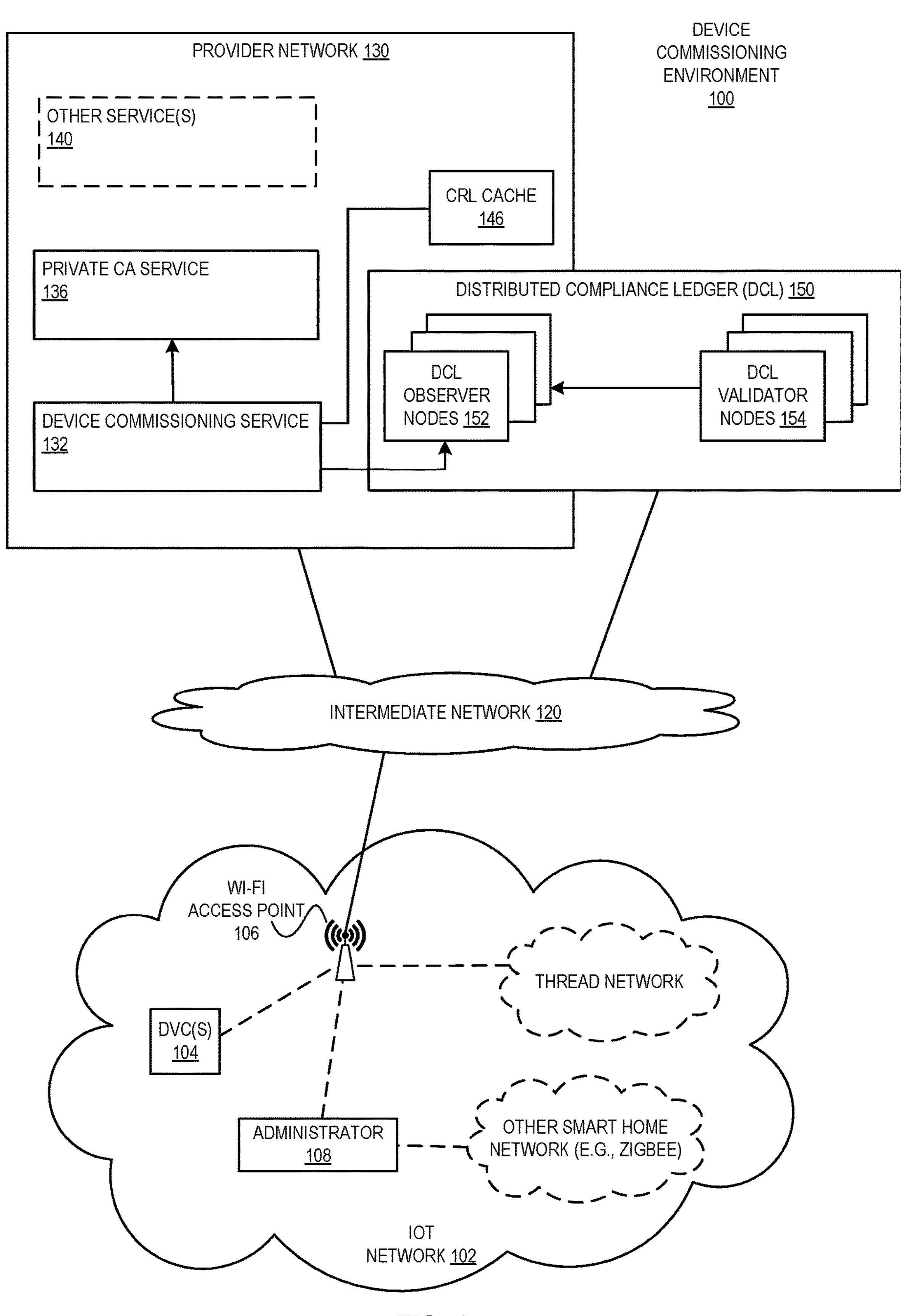
FIG. 1 illustrates an example of a system and method for a device commissioning service within an Internet-of-Things (IoT) device commissioning environment.

The present disclosure relates to systems, methods, and non-transitory computer-readable storage media (collectively referred to as "techniques") for an Internet of Things (IoT) device commissioning service. The disclosed techniques enable IoT device vendors to delegate to a provider network the intricate operations of IoT device attestation validation and the public key infrastructure (PKI) involved in IoT device commissioning.

GENERAL OVERVIEW

Standards exist to facilitate seamless and secure cross-vector connectivity for IoT devices, such as light switches, door locks, media devices, and other smart electronic devices. These standards ensure security and interoperability by enforcing device certification and authenticity checks before IoT devices can join a network and communicate with other devices on the network. One such standard is the "Matter smart home connectivity standard," authored by the Connectivity Security Alliance (CSA) trade association. The current version of the Matter standard is 1.1, published on May 18, 2023. Further information about the Matter standard and the CSA can be accessed on the internet at/developer-resource/specifications-download-request/within the csa-iot.org domain.

The process of adding an IoT device to a network, often referred to as "commissioning," poses complexities, expenses, and consumes time for IoT device vendors. Commissioning software is typically executed on an administrator device (sometimes called an "administrator," "controller," or "commissioner"), which ensures security and interoperability by identifying each IoT device and allowing only certified IoT devices to join the network. In certain scenarios, the commissioning software undertakes intricate cryptographic identity assessments through the validation of digital certificates. Additionally, it may verify device certification status by referencing the device certification record in a large, centralized data repository. This segment of commissioning, where intricate cryptographic identity checks are carried out and device certification status is confirmed, is at times termed "device attestation validation." As described in greater detail herein, the techniques disclosed herein enhance the process of device attestation validation.

One possible approach through which a IoT device vendor can achieve device attestation validation is by the IoT device vendor configuring their administrator devices to obtain and verify device certification details from a publicly accessible data repository. Nevertheless, this approach brings about challenges related to availability and scalability, not to mention the complexity involved in configuring the administrator devices to properly verify the device certification details. An alternative method involves the IoT device vendor setting up a network of distributed data storage nodes to disseminate certification information, a solution that proves intricate and costly. Techniques disclosed herein mitigate or eradicate the necessity for IoT device vendors to construct and sustain their own service. This reduction in requirement not only reduces costs for the IoT device vendor but also expedites the deployment of solutions to the market for the IoT device vendor.

In certain instances, the techniques incorporate security workflows mandated by the Matter standard to establish device identities and ensure their certification, functioning as an IoT device commissioning service within a provider network. As the device attestation validation process within the Matter standard advances, the service provider of the provider network can synchronize the implementation of the IoT device commissioning service, thus relieving IoT device vendors of this responsibility. This simplifies the complexity of software employed by IoT device vendors during the commissioning process, eliminating the necessity for them to depend on a publicly accessible data repository or establish their own network of distributed nodes to provide certification information.

In some examples, the techniques include a managed private digital certificate authority service in the provider network to issue the private digital certificates used to identify validated IoT devices, which reduces costs and complexity for IoT device vendors by not having to set up and manage their own public key infrastructure (PKI). Using these techniques, a provider network can enable IoT device vendors to focus their investments on building the best solutions for their consumers and leave the undifferentiated heavy lifting of IoT device commissioning to a highly available, secure, and scalable provider network service.

IoT Network

FIG. 1 illustrates an example of a system and method for an Internet of Things (IoT) device commissioning service within the IoT device commissioning environment 100.

An IoT network 102 includes one or more IoT devices 104, a network access point 106, and an IoT administrator device 108 (equivalently "administrator 108," "controller 108," or "commissioner 108"). In some examples, the network 102 constitutes an assemblage of interconnected devices and systems within a residential environment, designed for communication, interaction, and remote or automated control using digital technologies. In such cases, the network 102 enhances convenience, comfort, energy efficiency, security, and the overall quality of life for the owner or occupant of the residence.

While in certain instances, network 102 operates within a residential environment, the network 102 can be in other settings such as office buildings, retail establishments, or school environments. Therefore, the techniques disclosed herein are not confined solely to home or residential contexts. The techniques are equally applicable in diverse contexts and environments.

In some examples, the network 102 is comprised of Ethernet, IEEE 802.3, Wi-Fi, IEEE 802.11, Thread, Zigbee, IEEE 802.15.4, or Bluetooth Low Energy (equivalently "Bluetooth LE") implementing devices. These devices are interconnected with a local fabric that enables them to communicate with each other over the network 102, utilizing the same application layer, even when employing distinct network technologies underneath.

In some examples, all inter-device communication within the network 102 is accomplished via the Internet Protocol (IP), such as IPv4 or IPv6, or another suitable protocol. For instance, communication among devices on the network 102 could occur over IPv4 if the network 102 is segregated from the intermediate network 120 (e.g., the internet), such as by a network firewall system or a network address translation (NAT) system. Alternatively, IPv6 could be employed if devices in network 102 are linked to the intermediate network 120 using IPv6 infrastructure.

In some examples, the topology of the network 102 encompasses connections between devices and other networks. Different networks within the network 102 can communicate with each other through central hubs, such as a Thread border router of a Thread network or a Wi-Fi access point 106, for instance.

In certain scenarios, the network 102 is linked to a network that operates on a distinct application layer protocol, such as a Zigbee network, through the administrator 108. While in some examples, the access point 106 is a Wi-Fi access point, such as an access point that communicates with other devices (e.g., 104 and 108) according to an IEEE 802.11 family implementation, access point 106 additionally or alternatively communicates with other devices on network 102 according to an Ethernet or IEEE 802.3 implementation in other examples.

IoT Network—IoT Device

The term "IoT device 104" is employed here to indicate an individual IoT device within the IoT network 102. IoT devices 104 can encompass one or more various types of smart electronic devices such as lighting devices (e.g., on/off lights, dimmable lights, color temperature lights, extended color lights, etc.); smart plug or smart outlet devices (e.g., on/off plug-in units, dimmable plug-in units, water pumps, etc.); switch or control devices (e.g., on/off light switches, dimmer switches, color dimmer switches, control bridges, pump controllers, generic switches, etc.); sensor devices (e.g., contact sensors, light sensors, occupancy sensors, temperature sensors, pressure sensors, flow sensors, humidity sensors, on/off sensors, etc.); closure devices (e.g., door locks, door lock controllers, window coverings, window covering controllers, etc.); HVAC devices (e.g., heating/cooling units, thermostats, fans, etc.); and other suitable IoT devices or smart electronic devices.

In some examples, an IoT device 104 is comprised of a "node." The node embodies an implementation of a standard networking protocol stack, such as the Matter standard, crafted to facilitate a cohesive communication standard across devices. While in certain instances, the node adheres to the Matter standard, in other cases, the node may adopt an alternative unified communication standard. For instance, the node could implement a unified communication standard other than Matter that, like Matter, addresses concerns related to IoT device and network interoperability, choice, and user-friendliness.

In some examples, an IoT device 104 is composed of multiple nodes, where each such node is a complete implementation of application functionality (e.g., Matter application functionality) on a single networking protocol stack. Each such node is identifiable on the network 102 with a unique network address. Each node on the network 102 can communicate with other nodes on the network 102.

In certain instances, the networking protocol stack implemented by an IoT device 104 aligns with the OSI/ISO stack layer model, establishing an application layer atop an internet protocol (IP)-based transport layer (e.g., IPv4 or IPv6). This configuration enables the routing of messages independent of the underlying physical and link layers. In specific cases, the networking protocol stack within an IoT device 104 interfaces at its lowest layer with a transport layer. Payloads traverse down the protocol stack on the transmitting device and ascend the protocol stack on an IoT device 104.

In some examples, the application layer of the stack defines the operational logic for a given product. For instance, in the context of a door lock application, this operational logic might involve the opening and closing of a designated model of door bolt in response to a voice command from a specific virtual assistant technology. It could also encompass responses to inputs from a designated PIN keyboard user interface, reactions involving a designated LED on the door bolt model, and more.

In certain scenarios, the networking protocol stack implemented by an IoT device 104 encompasses a subset or the entirety of sub-layers within the application, presentation, session, or transport layers. These include: a data model sub-layer, an interaction model sub-layer, an action framing sub-layer, a security sub-layer, a message framing and routing sub-layer, and a transport and IP framing sub-layer.

In some examples, the data model sub-layer facilitates remote operations of an IoT device 104 through attributes, commands, and events, organized into logical groupings known as "clusters." Each cluster possesses a distinct scope and behavior, ensuring interoperability between the devices on the network 102. The interaction model sub-layer supports data exchange between the devices on the network 102, defining permissible interactions for nodes of both "client" and "server" roles.

In some examples, the action framing sub-layer converts interaction-related messages from the interaction model sub-layer into serialized binary packets. The security sub-layer takes encoded frames from the action framing sub-layer, encrypts them, and appends them with a message authentication code (MAC). The message framing and routing sub-layer assembles the payload with necessary and optional header fields, specifying message properties and logical routing details.

In some examples, the transport and IP framing sub-layer oversees payload transmission over the IP network to an IoT device 104. This is achieved using either the Transmission Control Protocol (TCP) or a combination of the User Datagram Protocol (UDP) and a message reliability protocol, such as the Matter Message Reliability Protocol (MRP).

In certain instances, an IoT device 104 may comprise one or more endpoints, each encapsulating one or more feature sets corresponding to one or more distinct device functionalities. To illustrate, in a voice-controlled door lock device, one endpoint might encompass the feature set for manipulating the bolt, whereas another endpoint might encompass the feature set related to a temperature sensor. Endpoints are further assembled from one or more clusters, which aggregate attributes, commands, and events that collectively constitute each individual feature within a set.

To exemplify, within an endpoint designed for bolt operation, a cluster could bundle attributes for shifting the bolt to open or closed positions, while another cluster might consolidate attributes for managing alarms triggered by unauthorized door openings. Attributes function as data entities representing physical quantities or states. They are stored in a memory of the IoT device 104 and can also be dynamically computed as needed. Commands denote actions capable of initiating specific behaviors in other devices. For instance, within a door lock device, the "lock door" command can trigger a corresponding action on a physical device. Events represent a variant of attributes that communicate alterations in device states. They can also serve as historical data records, capturing past occurrences on the IoT device 104.

IoT Network—Administrator

In certain examples, the administrator 108 functions as a node within the network 102. In this sense, the administrator 108 can be regarded as one of the IoT devices 104. While some of the IoT devices 104 within network 102 encompass smart electronic devices such as lighting devices, smart plugs or outlets, switch or control devices, sensor devices, closure devices, HVAC devices, and so forth, the administrator 108 is typically a higher-powered electronic device such as a general-purpose computing device. For example, the administrator 108 can be a mobile phone, a laptop computer, a desktop computer, a tablet computer, a smart speaker, a voice-interactive personal digital assistant, a smart television, or another smart electronic device.

In certain examples, the administrator 108 is used for the pairing and control of IoT devices 104 within the network 102. The administrator 108 can interact with the IoT device 104 through a variety of distinct protocols.

In certain instances, the administrator 108 utilizes Bluetooth LE or another suitable wireless networking protocol for interacting with the IoT device 104 during its commissioning phase. This process ensures the secure transfer of network credentials and the provisioning of the IoT device 104 into the network 102. Once the IoT device 104 becomes part of the network 102, application messages are exchanged with other devices within the network 102 using Internet Protocol (IP) communications.

According to techniques disclosed herein, the administrator 108 can offload intricate and complex portions of the device commissioning process to the device commissioning service 132 of the provider network 130. By doing so, the implementation of the administrator device 108 for the IoT device vendor is simplified.

In some examples as described in greater detail herein, the offloaded portions include device attestation validation and node operational certificate issuance of a device commissioning process.

IoT Network—Commissioning Process

In certain examples, a commissioning process occurs within the network 102 between the administrator 108 and an IoT device 104 referred to as an "accessory" device 104. The purpose of this commissioning process is to securely incorporate the accessory device 104 into the fabric of the network 102. A fabric is composed of nodes within the network 102 that engage in communication with one another. The IoT devices 104 within the fabric share a common root of trust and configuration state and can be distinguished by a unique fabric identifier (such as a 64-bit value). In this context, the term "root of trust" pertains to a root certificate authority (CA), which is identified by a probabilistically unique public key of a public and private asymmetric cryptographic key pair.

In specific instances, the commissioning process comprises multiple stages, categorized into unsecured stages, a passcode-authenticated session establishment (PASE)-secured stage, and a certificate-authenticated session establishment (CASE)-secured stage. The commissioning process commences with an unsecured device discovery stage, followed by an unsecured PASE security setup stage. Following this, a series of PASE-secured stages ensue, which encompass a fail-safe establishment stage, a preliminary configuration stage, a device attestation validation stage, an installation of credentials stage, and a network commissioning stage.

In specific cases, the techniques disclosed herein employ the device commissioning service 132 of the provider network 130 within the PASE stage during the device attestation validation stage and the installation of node operational credentials stage to offload device commissioning tasks that would ordinarily need to be performed by the administrator 108.

In certain examples, the network 102 as a system strives to achieve specific objectives, such as authenticating only reputable IoT devices 104 into the fabric and ensuring the confidentiality of message exchanges among fabric nodes. When it comes to establishing sessions between these fabric nodes, encryption keys are interchanged between them to facilitate secure communications. This process also encompasses mutual node authentication, offering both nodes the assurance that they are engaging with a trusted counterpart. As an illustration, elliptic curve cryptography might be employed for both key exchange and the provision of digital signatures (e.g., using the NIST P-256 curve).

In certain examples, the network 102 incorporates two session establishment methods known as PASE and CASE.

In the PASE method, both nodes share an identical secret in the form of an 8-digit passcode. The Simple Password-Authenticated Key Exchange 2+(SPAKE2+) algorithm utilizes this shared secret to facilitate a secure exchange of keys over an insecure channel. This procedure is carried out during the device commissioning process.

In the CASE scenario, both nodes possess node operational certificates (NOCs) that trace their origins to a common root of trust. These NOCs are employed by the SIGn-and-MAc (SIGMA) algorithm to facilitate mutual node authentication and a secure exchange of keys over an insecure channel. This operation occurs during the establishment of secure communication between nodes that have already been commissioned.

The concept of a root of trust revolves around a digital certificate authority (CA), identified by its root public key corresponding to a root digital certificate (RCACERT). This CA serves as the focal point of the system. It is responsible for issuing and assigning node operational certificates (NOCs) and intermediate certificate authority certificates (ICACERTs). During the commissioning process, NOCs are installed on IoT devices 104 by the administrator 108, alongside trusted ICACERTs and root certificates (RCACERTs).

In certain instances, the issuance and assignment of ICACERTs and RCACERTs are managed by the device commissioning service 132 of the provider network 130, in collaboration with the private certificate authority (CA) service 136 in the same provider network 130. Alternatively, the private CA service 136 may be in a different provider network than the device commissioning service 132. There is no requirement that the device commissioning service 132 and private CA service 136 be offered by the same provider network.

In some examples, the private CA service 136 manages ICACERTs and RCACERTs for multiple IoT device vendors. Such management may include automatically overseeing the lifecycle of the certificates on behalf of the IoT device vendors to ensure that they are valid and up to date. For example, before an ICACERT is set to expire, the private CA service 136 can automatically generate a certificate signing request for an RCACERT to sign and issue a new or renew an ICACERT. As another example, an IoT device vendor may have many (e.g., millions) IoT devices in the market and thus many corresponding NOCs. An ICACERT used by the vendor to issue NOCs may have a cap on the number of NOCs it can issue. In this case, the private CA service 136 can automatically manage the rotation of ICACERTs so that a new ICACERT automatically replaces an existing ICACERT when or just before the existing ICACERT reaches its issuance limit.

In some examples, the private CA service 136 securely stores the private keys of ICACERTs and RCACERTs in hardware security modules (HSMs) or other specialized hardware devices in provider network 130 that provide a high level of protection for cryptographic keys. The private CA service 136 may store the private keys in isolated environments within the HSMs that ensure the private keys are segregated from other processes and applications, thereby minimizing the risk of unauthorized access or exposure. Furthermore, the private keys may be generated within the HSMs themselves, which ensures that the private keys are not exposed to the external environment during their creation, thereby reducing the risk of key leakage during generation. In some examples, the private keys of NOCs are generated and stored at the IoT devices 104, as discussed in greater detail herein with respect to a device commissioning process.

In certain cases, when secure communication is established between nodes on the network 102, the 128-bit AES-CCM algorithm is used to ensure the confidentiality and integrity of exchanged messages. A typical message consists of a message header with session and transport information, a protocol header describing the message's meaning, and a payload containing the protocol-specific content.

The AES-CCM algorithm ensures the integrity of all three message components, but in certain cases, only the protocol header and payload are encrypted. This is because the message header contains information needed to compute the AES-CCM nonce, required for decrypting the rest of the message, including security flags and message counters.

In certain examples, the device commissioning process starts with the administrator 108 identifying an accessory device 104 that can join the network 102. The accessory device 104 signals its availability to the administrator 108 by broadcasting on the network 102 using various advertising methods, such as BLUETOOTH LE, DNS-based Service Discovery (DNS-SD), WI-FI SOFT-AP, or other appropriate methods.

In specific cases, an advertisement priority, like a Bluetooth LE advertisement priority, is determined as part of the onboarding information for the accessory device 104. This onboarding information, including details like vendor ID, product ID, device discriminator, setup passcode, and discovery capabilities bitmask, which includes the advertisement priority, is provided to the administrator 108 in a pre-commissioning phase.

For instance, the onboarding information for the accessory device 104 can be encoded on the device or within its packaging. The administrator 108 receives this information through methods such as a manual pairing code (a sequence of digits) or a QR code that can be scanned with a mobile device.

In some cases, during the security setup in the PASE stage, the administrator 108 utilizes the PASE protocol to initiate the initial session with the accessory device 104. This PASE session is established using a passcode provided out-of-band, which is used to derive encryption keys. Importantly, the passcode is unique to the administrator 108 and the accessory device 104, ensuring it remains unknown to other entities.

In specific cases, in the fail-safe establishment stage, the administrator 108 instructs the accessory device 104 to create a backup of its initial configuration. This serves as both a backup and starts a timer for the entire commissioning process. The timer is deactivated when the fail-safe is disarmed at the end of the commissioning process.

In specific instances, in the preliminary node configuration stage, the administrator 108 extracts attributes from the basic information cluster of the accessory device 104 and determines its device type. Following this, the administrator 108 proceeds to configure the accessory device 104 with regulatory information, including location, country, and the current UTC time.

In some cases, during the device attestation validation stage, the administrator 108 checks whether the accessory device 104 has a certification. However, in certain instances, this responsibility is transferred from the administrator 108 to the device commissioning service 132. This shift relieves both the administrator 108 and the vendor of the administrator 108 from configuring the administrator 108 to perform potentially complex assessments that may change over time.

In specific scenarios, within the device attestation validation stage, the administrator 108 dispatches a randomly generated 32-bit attestation nonce to the accessory device 104. The accessory device 104 utilizes this nonce to generate and subsequently returns signed attestation information that incorporates the nonce. The inclusion of the nonce serves as a preventive measure against replay attacks directed at the administrator 108. Following this, the administrator 108 transmits the signed attestation information to the device commissioning service 132 for validation.

In some cases, the device commissioning service 132 confirms the verification's success when the accessory device 104 can prove the legitimacy and ownership of crucial attestation elements through provided signed attestation information. If the device commissioning service 132 cannot verify validity and ownership based on the provided information, the verification process is considered unsuccessful, and this result is communicated to the administrator 108. Then, the administrator 108 can choose to either terminate or continue with the commissioning process for the accessory device 104, following a predefined policy.

In certain cases, during the "installing operational credentials" stage, the administrator 108 places a node operation certificate (NOC) on the accessory device 104, with the assistance of the device commissioning service 132 in some instances. Once the NOC is installed, the accessory device 104 becomes a new node on the network 102. In the subsequent "network commissioning" stage, the administrator 108 configures the accessory device 104 with either WI-FI or Thread operational network credentials and instructs it to connect to the network 102.

In certain scenarios, once the commissioning process is completed successfully, the accessory device 104 that has become part of the network 102 fabric may have various configurations, which could include a new instance name derived from the fabric ID and a node ID assigned by the administrator 108, a new node operational certificate (NOC) specific to the fabric it joined, a new private cryptographic key for the NOC, a fresh access control list, operational network details, or any other relevant configurations.

Distributed Compliance Ledger

In certain instances, the distributed compliance ledger 150, referred to as "DCL 150," serves as a highly secure cryptographic database. Its primary role is to act as the authoritative source of information regarding the compliance status of IoT device vendors and their specific device models. Furthermore, DCL 150 supplies verified users with vendor device metadata. IoT device vendors input details about the IoT devices they produce into DCL 150 before releasing these devices into the market.

In certain scenarios, DCL 150 is a distributed database that is spread across multiple servers located globally. It is built upon the Tendermint protocol, which forms the foundation for underlying blockchain or similar distributed ledger technology. DCL 150 operates as a secure hub for disseminating a list of active and revoked root digital certificates, ensuring the security of this critical information.

In some instances, DCL 150 is a distributed service that consists of validator nodes 154 located outside the provider network 130, along with one or more observer node(s) 152 within the provider network 130. The validator nodes 154 offer both read and write access to the IoT device vendor data stored in DCL 150. These validator nodes 154 create a peer-to-peer network and maintain a persistent database of records. They validate new records by verifying signatures against approved cryptographic keys stored in DCL 150. Validation is accomplished through a consensus protocol based on a blockchain of validator nodes 154 within DCL 150. These validator nodes 154 confirm vendor data and vote to approve an operation. For instance, a write operation may require the approval of two-thirds of the validator nodes 154 within DCL 150 to be successful. In contrast, observer nodes 152 provide read-only access to the vendor data stored in DCL 150.

In some scenarios, observer nodes 152 are located within the provider network 130 to offer closer access to vendor data in DCL 150 for the device commissioning service 132. This proximity enhances data retrieval performance compared to accessing validator nodes 154. Vendor data that is written to the validator nodes 154 is duplicated or replicated to the observer node(s) 152. For instance, vendor data related to IoT device vendors using the device commissioning service 132 may be replicated from the validator nodes 154 to the observer nodes 152. Alternatively, all vendor data stored in the validator nodes 154 may be replicated to the observer nodes 152, even for IoT device vendors not using the device commissioning service 132.

In certain instances, the device commissioning service 132 accesses vendor data from local observer node(s) 152, including root certificates, required during the device commissioning process. This eliminates the need for the administrator 108 to personally retrieve this vendor data from DCL 150. This simplifies the implementation of the commissioning process for the administrator's vendor because the administrator 108 doesn't require configuration with software or executable logic to access DCL 150 data. For instance, compliance-related information stored in DCL 150, such as device model details (including firmware and hardware versions), device compliance status, and root certificates, may be necessary during the commissioning process. Device commissioning service 132 retrieves this compliance-related information from observer node(s) 152 and processes it in accordance with a device attestation validation procedure, reducing the complexity of the administrator 108's implementation for the vendor.

Device Attestation Validation Procedure

Device attestation validation refers to a sub-process of the device commissioning process of verifying if an accessory device 104 is certified and produced by a verified IoT device vendor or manufacturer. For example, a verified IoT device vendor may be member of the Connectivity Standards Alliance (CSA). A goal of device attestation is to ensure no counterfeit IoT devices 104 join the network 102 and that a given access device 104 being checked is genuine.

In some examples, device attestation validation is based on a digital certificate-based chain-of-trust and is a mandatory part of the commissioning process that the accessory device 104 must pass before being allowed to join the fabric of the network 102.

In some scenarios, device attestation validation occurs as part of the commissioning process for an accessory device 104. Before the administrator 108 provisions the accessory device 104 to the network 102's fabric, it's essential to verify the digital certificates of the accessory device 104 and obtain its information from DCL 150 as a component of device attestation validation.

The process unfolds as follows: The administrator 108 initiates a request for device attestation validation of the accessory device 104 through the device commissioning service 132, facilitated by an API and intermediate network 120 (e.g., the internet). To ensure the confidentiality of communication between the accessory device 104 and the administrator 108, an encrypted session is established using PASE or a similar method. Additionally, the administrator 108 establishes an encrypted session with the device commissioning service 132, using transport layer security (TLS), secure sockets layer (SSL), or a suitable cryptographic protocol.

Within this secure communication channel, the administrator 108 obtains the device certificates and other attestation information from the accessory device 104. This data is then sent by the administrator 108 to the device commissioning service 132 for device attestation validation. The device commissioning service 132 carries out the device attestation validation procedure, thereby relieving the administrator 108 from performing this procedure. Subsequently, the device commissioning service 132 conveys the status or result of the device attestation validation for the accessory device 104 to the administrator 108, who can decide whether to permit the accessory device 104 to join the network 102's fabric, based on this status or result.

In some examples, during the device attestation validation procedure, the device certification service 132 checks the digital certificates on the accessory device 104 obtained from the administrator 108. These digital certificates form a certificate chain. All digital certificates are issued by certificate authorities (CA).

In some instances, a recognized standards organization, like the Connectivity Standards Alliance (CSA), designates certain entities, such as IoT device vendors or organizations supporting the standards body, as product attestation authorities (PAAs). These PAAs serve as the root certificate authorities responsible for the device attestation process.

Each PAA possesses an asymmetric cryptographic key pair, comprising a private key and a public key, and a self-signed PAA root digital certificate. The private key is utilized by the PAA to digitally sign the digital certificates issued by product attestation intermediates (PAIs). PAIs are entities directly responsible for issuing device attestation certificates (DACs). Each PAI intermediate certificate is generated in the form of a certificate signing request by the PAI and submitted to a PAA for signature with its private key.

In certain instances, a PAI certificate occupies an intermediary position within the certificate chain for an IoT device 104. This PAI certificate is linked to its own public and private key pair. It receives its signature from the private key of a PAA root certificate situated at the pinnacle (root) of the certificate chain for the IoT device 104. The private key of the PAI certificate is employed to sign a DAC leaf certificate, positioned at the lowest level of the certificate chain for the IoT device 104.

In certain scenarios, an accessory device 104 undergoing device attestation validation by the device commissioning service 132 includes some or all of the following elements: a DAC, the private key corresponding to the DAC, the PAI intermediate certificate utilized for DAC issuance, and a certification declaration. The DAC plays a crucial role in the device attestation process orchestrated by the device commissioning service 132. In some instances, the DAC takes the form of a DER-encoded X.509v3-compliant certificate, as outlined in RFC 5280. It is generated (issued) using the PAI intermediate certificate and encompasses details related to the Vendor ID and Product ID specific to the accessory device 104. The private key associated with the DAC is unique to the accessory device 104. Meanwhile, the PAI intermediate certificate serves as a digital certificate granted by a PAA and is instrumental in the creation (issuance) of the DAC for the accessory device 104.

In certain instances, the IoT device vendor preconfigures the accessory device 104 with the DAC, its corresponding private key, and the PAI before releasing the accessory device 104 to the market. Furthermore, a certification declaration, which is a cryptographic document typically generated by a standards organization like the CSA, is specific to the type of IoT device represented by the accessory device 104. This declaration serves as a means for the device commissioning service 132 to confirm the certification status of a particular device type. The certification declaration encompasses various pieces of information crucial for device attestation, which may include elements such as a Vendor ID, a Certificate ID, a device certification type, optional DAC-related details, and additional pertinent information.

In some scenarios, during the commissioning process, the administrator 108 acquires the certification declaration from the accessory device 104 and subsequently forwards it to the device commissioning service 132 when requesting device attestation validation for the accessory device 104. The device commissioning service is responsible for verifying the certification declaration on behalf of the administrator 108, thus relieving the administrator 108 of this particular responsibility.

During the device attestation process, in certain examples, the administrator 108 initiates the generation of a random attestation nonce, typically a random 32-byte value. This attestation nonce is then transmitted to the accessory device 104, accompanied by a request for the necessary attestation information. The accessory device 104, in response, furnishes the requested attestation information to the administrator 108, including components such as the DAC and the DAI intermediate certificate present within the certificate chain specific to the accessory device 104.

The provided attestation information encompasses a range of data, potentially including the DAC and DAI intermediate certificate within the accessory device 104's certificate chain, the certification declaration relevant to the accessory device 104's type, the attestation nonce, a timestamp, firmware details, or any other pertinent attestation information.

Following the receipt of this attestation information from the accessory device 104, the administrator 108 proceeds to transmit it to the device commissioning service 132, thereby requesting the verification of the accessory device 104 through the device attestation validation procedure. The device commissioning service 132, during the validation process, cross-references the received attestation information with the information stored on the accessory device 104. For example, this verification might entail comparing the Vendor ID extracted from the attestation information with the Vendor ID present in the DAC, and confirming the Certificate ID obtained from the certification declaration by checking it against an entry in the DCL 150.

If the accessory device 104 successfully passes the device attestation procedure conducted by the device commissioning service 132, it is verified as an authentic IoT device, such as a legitimate Matter device.

Figure 2:
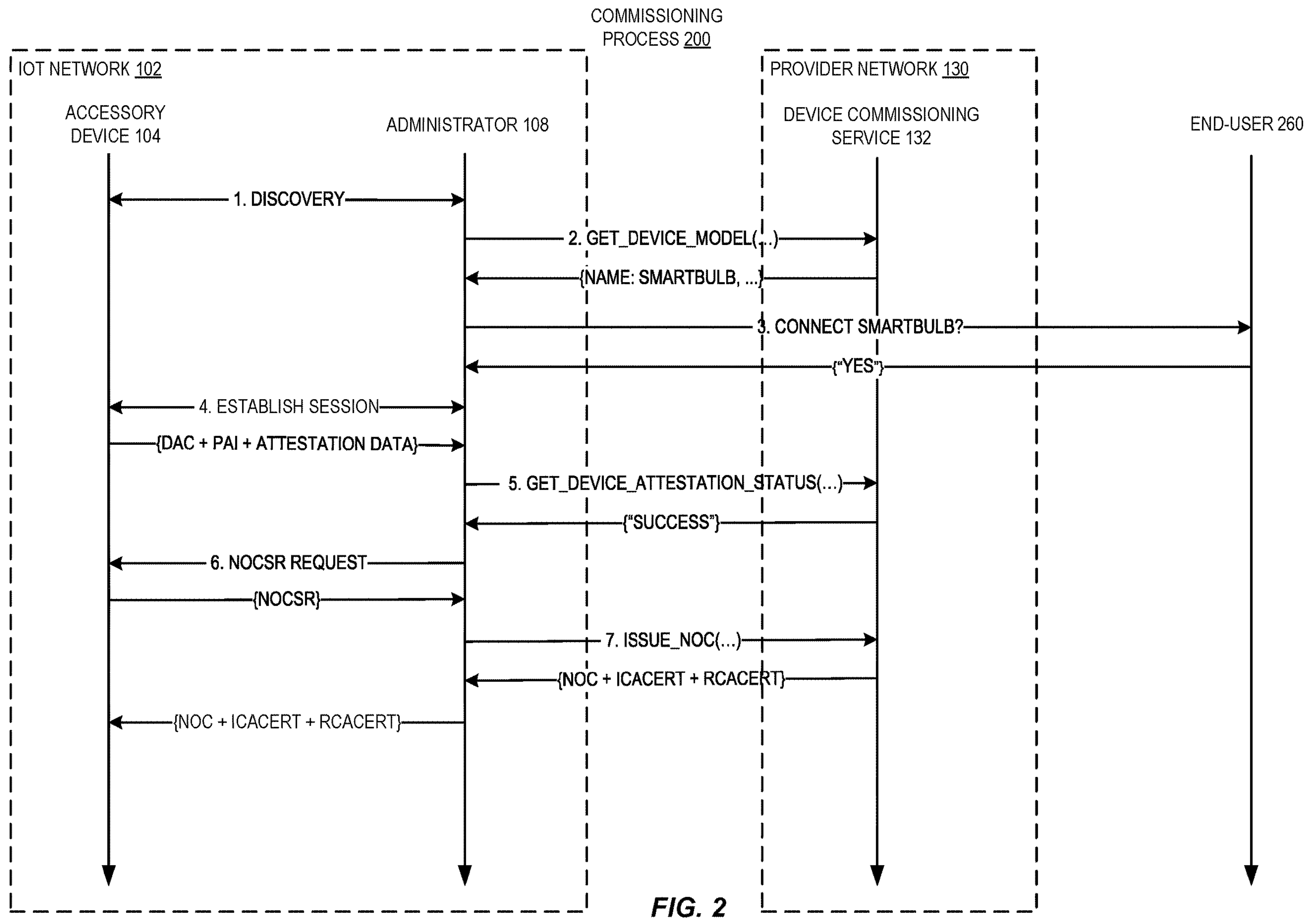
FIG. 2 illustrates an example interaction between various components during a device commissioning process.

Turning now to FIG. 2, it illustrates an example of a device commissioning process for commissioning an accessory device on a network.

Process 200 commences at operation 1, during which the administrator device 108, situated on the IoT network 102, initiates the discovery of an accessory device 104 on the same IoT network 102. This discovery typically takes place when the accessory device 104 signals its presence on the network 102. This signaling can be achieved through various advertising methods, such as BLUETOOTH LE, Domain Name Service (DNS)-based Service Discovery (DNS-SD), or WI-FI SOFT-AP functionality, among others.

At operation 2, upon detecting the presence of the accessory device 104 within the IoT network 102, the administrator device 108 initiates communication by sending an API request to the device commissioning service 132, located within the provider network 130. This API request, referred to as "GET_DEVICE_MODEL" in this instance but potentially named differently based on specific implementation needs, serves the purpose of retrieving device model data related to the accessory device 104 or its type. The device commissioning service 132 obtains this data from the DCL 150, which it can access through observer nodes 152. The administrator device 108 may utilize this device model data, or portions thereof, in its interactions with end-users, potentially including information like the product name of the accessory device 104 or links to its user manual. For example, if the administrator device 108 is a mobile phone or another computing device with a video display, it may display the product name and provide an interactive link to the user manual.

Upon receiving the GET_DEVICE_MODEL API request from the administrator 108, the device commissioning service 132 proceeds to retrieve the device model data from one or more DCL observer nodes 152 located within the provider network 130. Subsequently, the device commissioning service 132 sends the obtained device model data back to the administrator 108. As an example, in the scenario depicted in FIG. 2, the accessory device 104 is identified as a smart lighting device with the product name "SMARTBULB."

At operation 3, the administrator 108 initiates a prompt to the end-user 260, inquiring whether they wish to permit the accessory device 104 to join the IoT network 102. The end-user 260 is typically located in close proximity to the physical location of the administrator device 108. For instance, if the administrator device 108 is a mobile phone, the end-user 260 might be holding the mobile phone in their hand. Alternatively, if the administrator device 108 is a voice-activated personal digital assistant, the end-user 260 could be situated in the same room as the administrator device 108.

The specific prompt method may vary depending on the type of administrator device 108 being used. For instance, if the administrator device 108 features a touch screen display, it may present a graphical user interface on the touch screen display, offering touch-selectable options like "Yes" to permit the accessory device 104 to join the IoT network 102 or "No" to decline this request. On the other hand, if the administrator device 108 is a voice-activated personal digital assistant or a smart speaker equipped with a microphone, it may audibly ask the end-user 260, for example, "Do you want to add the SMARTBULB device to the network?" The end-user 260 can then respond with a "Yes" or "No" or provide an appropriate verbal command to the administrator 108.

At operation 4, assuming the end-user 260 has granted permission for the accessory device 104 to join the IoT network 102 during operation 3, the administrator device 108 and the accessory device 104 proceed to establish a cryptographically secured network communication session within the IoT network 102. This secured network session serves two main purposes: conducting device attestation validation of the accessory device 104 and facilitating the acquisition of a node operational certificate for the accessory device 104. The secured session can be, for instance, a PASE session as previously described.

Additionally, at operation 4, the administrator device 108 initiates a request for the accessory device 104 to provide its attestation information. In response to this request, the accessory device 104 furnishes its device attestation certificate (DAC), its product attestation intermediate (DAI) certificate, and any supplementary attestation data to the administrator device 108 through the secured network communication channel that has been established.

The device attestation certificate (DAC) is a distinct digital certificate specific to the accessory device 104. To illustrate, the DAC, along with its corresponding private key, can be integrated into the firmware of the accessory device 104 by the IoT device vendor during the device manufacturing process, before the accessory device 104 is made available in the market. In certain instances, the DAC is structured as a DER-encoded X.509v3-compliant digital certificate, following the specifications outlined in RFC 5280. The device attestation PKI hierarchy for the accessory device 104 comprises three essential components: the unique DAC associated with the accessory device 104, the product attestation intermediate (DAI) certificate responsible for issuing (signing) the DAC, and the self-signed root certificate of the product attestation authority (PAA) that issued (signed) the DAI certificate.

At operation 5, upon receiving the DAC and DAI certificate of the accessory device 104, along with additional attestation data, the administrator 108 initiates an API request directed towards the device commissioning service 132 within the provider network 130. This API request is denoted as "GET_DEVICE_ATTESTATION_STATUS" in this example, although its specific name may vary depending on the particular implementation requirements. The GET_DEVICE_ATTESTATION_STATUS API, which is further elaborated in FIG. 4, serves the purpose of validating the accessory device 104's DAC, as well as its firmware version, utilizing data stored in the DCL 150. Additionally, this API request encompasses other device attestation validation tasks, such as confirming that the DAC, the DAI certificate, and the PAA certificate within the accessory device 104's certificate chain have not been revoked.

After the device commissioning service 132 has completed the device attestation validation process for the accessory device 104, it returns a status representing the outcome of the device attestation validation to the administrator 108 in response to the GET_DEVICE_ATTESTATION_STATUS API request. Various statuses can be returned, including "SUCCESS," which indicates that the device attestation verification conducted by the device commissioning service 132 for the accessory device 104 was successful. Conversely, other returned statuses may indicate different error conditions, such as:

- The PAA root certificate of the certificate chain is untrusted, not found in the DCL, expired, has an invalid digital signature, or is revoked.
- The format of the PAA root certificate is invalid.
- The PAI intermediate certificate has an invalid argument.
- The PAI intermediate certificate of the certificate chain is expired, has an invalid digital signature, or has a different vendor ID than the PAA root certificate.
- The DAC of the certificate chain is expired, has an invalid digital signature, is revoked, is invalid, has an invalid argument, has a different vendor ID than the PAI, or has a different product ID than the PAI.
- The firmware information provided by the accessory device 104 in the additional attestation data does not match the firmware information stored in the DCL.

The attestation signature provided by the accessory device 104 in the additional attestation data is invalid.

The attestation elements provided by the accessory device 104 in the additional attestation data are malformed.

The attestation nonce generated by the administrator 208 for the commissioning process does not match the one in the attestation elements provided by the accessory device 104 in the additional attestation data.

In some examples, the status encompasses multiple status codes such as, for example, when there are multiple failures or error conditions during the device attestation validation procedure.

Depending on the status returned by the device commissioning service 132 to the administrator 108 in response to the GET_DEVICE_ATTESTATION_STATUS API request, the administrator 108 decides whether to continue with the commissioning process 100. For instance, if the returned status is anything other than "SUCCESS," the administrator 108 may choose not to issue a node operational certificate (NOC) to the accessory device 104. Consequently, this action effectively prevents the accessory device 104 from becoming a part of the IoT network 102.

At operation 6, if the status returned for the GET_DEVICE_ATTESTATION_STATUS API request is "SUCCESS," or the administrator 108 decides to proceed with the commissioning process 100 for the accessory device 104, the administrator 108 requests the accessory device 104 to create a node operational certificate (NOC) signing request. Upon receiving this request, the accessory device 104 generates a public-private cryptographic key pair for the NOC and creates the requested signing request. The NOC signing request generated by the accessory device 104 may contain the generated public key for the NOC and identifying information such as the vendor ID and the product ID. Additionally, the NOC signing request may be digitally signed by the accessory device 104 using the generated NOC private key. Finally, the signed NOC signing request is transmitted to the administrator 108.

At operation 7, upon receiving the NOC signing request, DAI certificate, and additional attestation data from the accessory device 104, the administrator 108 initiates an "ISSUE_NOC" API request to the device commissioning service 132 within the provider network 130. While this example uses the name "ISSUE_NOC" for the API request, it can be named differently as needed for specific implementations. The primary purpose of the "ISSUE_NOC" API request is to issue a node operational certificate (NOC) for the accessory device 104 based on the provided NOC signing request generated by the accessory device 104. It's important to note that the "ISSUE_NOC" API is distinct from the "GET_DEVICE_ATTESTATION_STATUS" API, as the administrator 108 may want to revalidate the accessory device 104 without the need to reissue a NOC. Additionally, this separation allows the administrator 108 to make an informed decision about whether to continue the commissioning process 200 based on the status returned by the device commissioning service 132 in response to the "GET_DEVICE_ATTESTATION_STATUS" API before issuing a NOC for the accessory device 104.

In response to receiving the "ISSUE_NOC" API request, the device commissioning service 132 can engage a certificate authority service (such as the private CA service 136) within the provider network 130 to issue the NOC. This NOC is issued based on an intermediate certificate authority certificate (ICACERT), which, in turn, is issued by a root certificate authority certificate (RCACERT). It's worth noting that both the ICACERT and the RCACERT can either belong to or be issued to a specific IoT vendor, organization, or entity.

In some scenarios, all NOCs issued to accessory devices within the same IoT network (part of the same fabric) are linked to the same root of trust. This linkage is identified by the root public key of the root certificate authority certificates to which the NOCs for the accessory devices are connected. After the certificate authority service within the provider network successfully issues the NOC for the accessory device 104, the device commissioning service 132 returns the complete certificate chain to the administrator 108. This chain includes the NOC, the ICACERT (corresponding to the private key that issued the NOC), and the RCACERT (corresponding to the private key that issued the ICACERT). The administrator 108 then forwards this entire certificate chain to the accessory device 104.

With the NOC and the certificate chain in hand, the accessory device 104 can securely and cryptographically communicate with other devices within the fabric of the IoT network 102 while also being able to authenticate itself.

The commissioning process 200 incorporates security workflows aimed at establishing device identities and ensuring their certification within an IoT device commissioning service located in a provider network. This approach simplifies the complexity of software used by IoT device vendors during the commissioning process, eliminating the need for them to rely on a publicly accessible data repository or create their own network of distributed nodes to provide certification information.

Furthermore, the commissioning process 200 utilizes a managed private digital certificate authority service within the provider network to issue the private digital certificates necessary for identifying validated IoT devices. This reduces costs and complexity for IoT device vendors, as they do not need to establish and manage their own public key infrastructure (PKI). By adopting the commissioning process 200, a provider network can empower IoT device vendors to concentrate their investments on developing superior solutions for their consumers. It allows them to delegate the labor-intensive aspects of IoT device commissioning to a highly available, secure, and scalable provider network service, freeing up resources for innovation and product development.

GET_DEVICE_MODEL API

Figure 3:
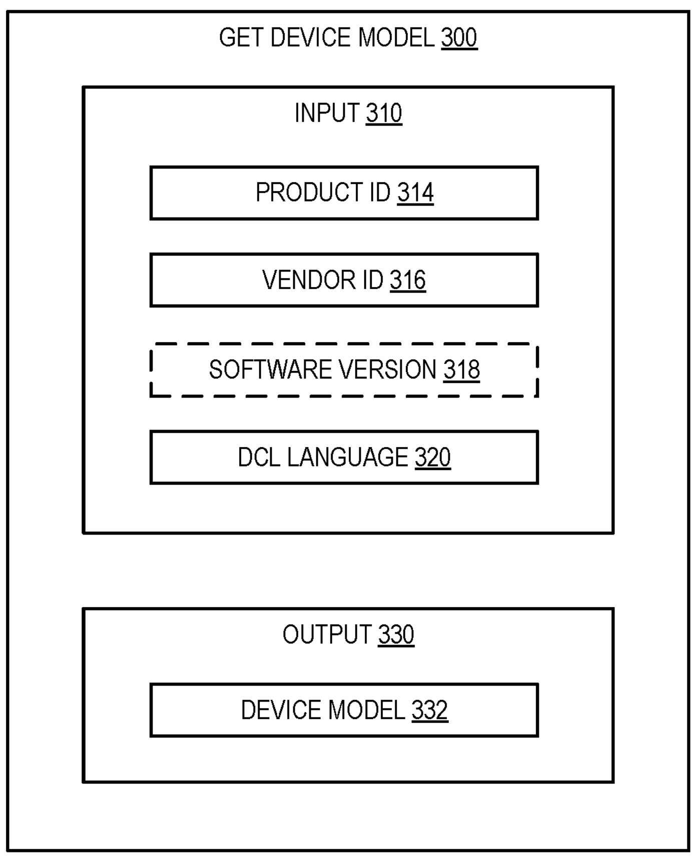
FIG. 3 illustrates an example of get device model application program interface offered by a device commissioning service.

FIG. 3 is a block diagram of the GET_DEVICE_MODEL API discussed above. The input 310 to the API 300 includes a product ID 314 for an accessory device being commissioned, a vendor ID 316 for the accessory device, an optional software version 318 for the accessory device, and a DCL language 320 for the accessory device. The output 330 includes a device model 332. The product ID 314 is a number (e.g., a 16-bit number) that uniquely identifies a product of the vendor of the accessory device that the accessory device is. The vendor ID 316 is a number that uniquely identifies the vendor (e.g., manufacturer, manufacturer group, or vendor group) of the accessory device. The optional software version 318 is specified if additional software version-specific data is to be obtained from the DCL and included in the device model 332 of output 330. The DCL language 320 selects the preferred language (e.g., via an RFC 5646 language tag) for the data obtained from the DCL and included in the device model 332 of the output 330. The device model 332 of the output 330 contains information about the accessory device identified by the product ID 314 and the vendor ID 316 such as a device type, product name, a URL to the user manual, a URL for support, a URL to a description of the product, etc.

GET DEVICE ATTESTATION STATUS API

Figure 4:
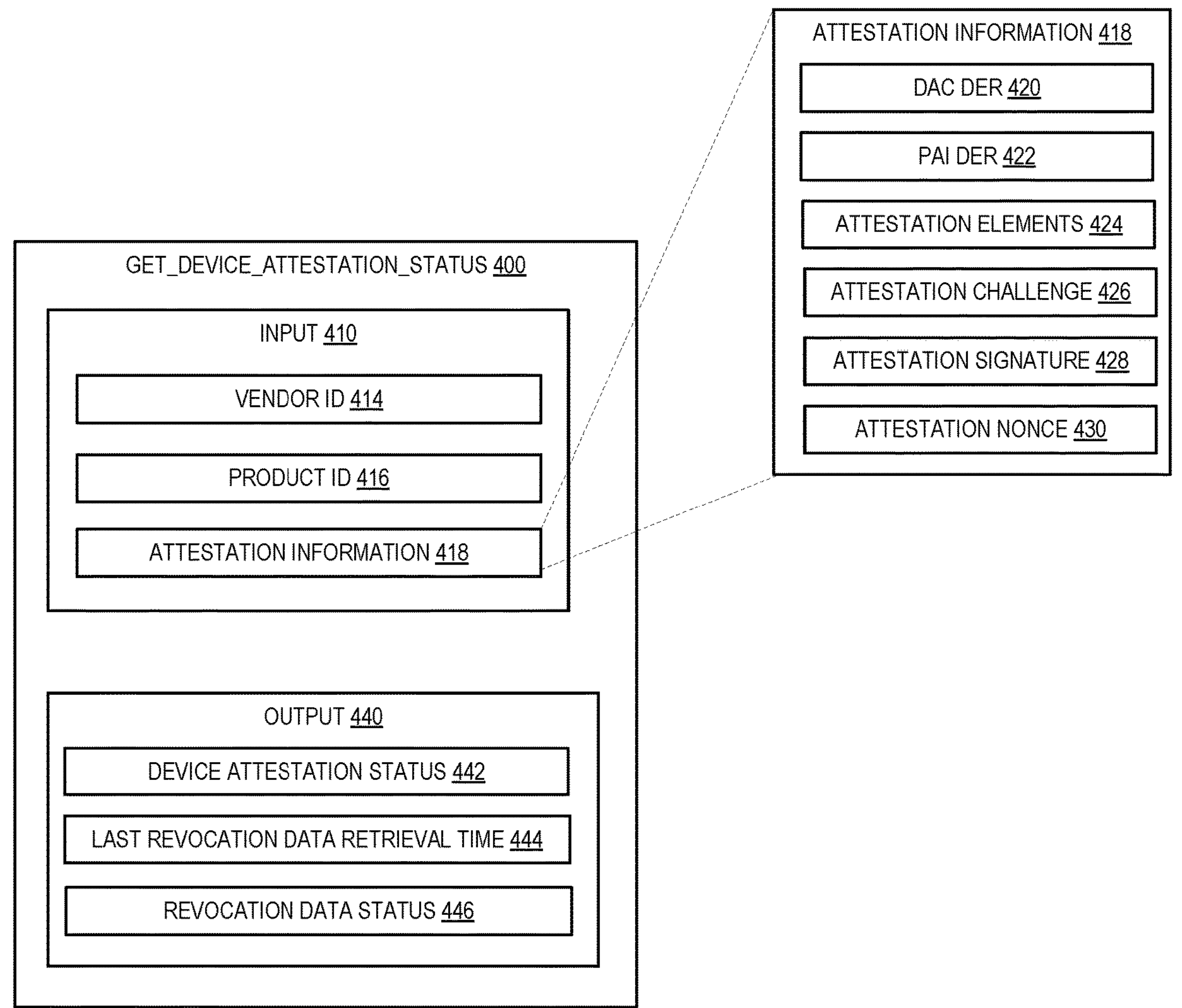
FIG. 4 illustrates an example of get device attestation status application program interface offered by a device commissioning service.

In FIG. 4, you can see a block diagram illustrating the GET_DEVICE_ATTESTATION_STATUS API, which was previously discussed. The input data for this API (labeled as 410) includes several components:

- Product ID (416): This represents the product identification for the accessory device currently undergoing commissioning.
- Vendor ID (414): This indicates the vendor identification for the accessory device.
- Attestation Information (418): This is a comprehensive set of data related to the accessory device's attestation. It encompasses various elements:
- Device Attestation Certificate (DAC) (420): A digital certificate unique to the accessory device, provided in PER format.
- Product Attestation Intermediate (PAI) Certificate (422): Another certificate specific to the accessory device, also in PER format.
- Attestation Elements (424): These include details such as the certification declaration for the accessory device, firmware information, and other relevant data utilized by the device commissioning service for device attestation verification.
- Attestation Challenge (426): A challenge derived by the administrator device during the session establishment with the accessory device.
- Attestation Signature (428): A digital signature created by the accessory device, using the private key of DAC 420, to sign the attestation elements 424 and attestation challenge 426.
- Attestation Nonce (430): A random value generated by the administrator device during the establishment of the secure communication session (e.g., a CASE session) with the accessory device.

The output (labeled as 440) of the API 400 consists of three main components:

- Device Attestation Status (442): This includes one or more status codes that convey the outcomes of the device attestation verification/validation process conducted by the device commissioning service for the specific accessory device.
- Last Revocation Data Retrieval Time (444): This indicates the timestamp associated with the most recent retrieval of revocation data. It represents the time when data related to certificate revocations was last obtained.
- Revocation Data Status (446): This component signifies the status of the revocation data. It provides information on the current state of data related to certificate revocations.

The discussion regarding the "Last Revocation Data Retrieval Time" (444) and the "Revocation Data Status" (446) requires some context. Referring to FIG. 1, the provider network 130 maintains a cache of certificate revocation lists (CRL cache 146). Although FIG. 1 depicts the CRL cache 146 as an external component to the device commissioning service 132, it can also be integrated as part of the device commissioning service 132. In DCL 150, URLs are stored that point to certificate revocation lists containing digital certificates that have been revoked. These revoked digital certificates encompass DACs, DAI certificates, and PAA certificates. One common reason for revocation can be the compromise of associated private keys. For instance, a malicious actor might gain unauthorized access to the firmware of a certified accessory device, where the private key of the accessory device's DAC is stored. This unauthorized access can lead to the compromise of the private key, and as a result, certificates like DACs, DAI certificates, or PAA certificates may be revoked. This revocation process is crucial in scenarios where certificate security is compromised.

In some instances, the URLs pointing to certificate revocation lists or delta certificate revocation lists are periodically retrieved (e.g., once a day) from the DCL 150 by the device commissioning service 132. Subsequently, these obtained CRLs or delta CRLs are accessed, and the identifiers of DACs, DAI certificates, and PAA certificates within these lists are then cached (indexed) in the CRL cache 146. The device commissioning service 132 can refer to the CRL cache 146 when conducting the device attestation verification process for an accessory device 104. More specifically, the device commissioning service 132 can utilize the CRL cache 146 to ascertain whether any of the DAC, DAI certificate, or PAA certificate associated with the accessory device 104, as provided in the GET_DEVICE_ATTESTATION_STATUS API request from the administrator 108, have been revoked. In the event of revocation, the relevant status information can be conveyed to the administrator 108.

The last revocation data retrieval timestamp 444 signifies the time when the device commissioning service 132 last successfully retrieved CRL information from the DCL 150. The revocation data status 446 conveys the current state of the revocation data within the DCL 150, which could be categorized as outdated, current, malformed, or unavailable. The administrator 108 can utilize the timestamp 444 and revocation data status 446 to make a determination regarding whether the device attestation verification should fail, even if the status 442 is "SUCCESS."

For instance, if the timestamp 444 indicates that it has been too long since the device commissioning service 132 last retrieved CRL information from the DCL 150, the administrator device 108 may conclude that the risk of DAC, DAI certificate, or PAA certificate revocation for the accessory device 104 is unacceptably high, potentially leading to a decision to prevent the accessory device 104 from joining the network 102. Alternatively, the administrator 108 may choose to prompt the end-user 260 to confirm whether they still wish to permit the accessory device 104 to join the network 102, despite the associated risk.

In another scenario, if the revocation data status 446 indicates that the revocation data in the DCL 150 is outdated, malformed, or currently unavailable, the administrator 108 may also decide to prohibit the accessory device 104 from joining the network 102 or seek confirmation from the end-user 260 regarding their preference to allow the accessory device 104 to join the network 102.

ISSUE NOC API

Figure 5:
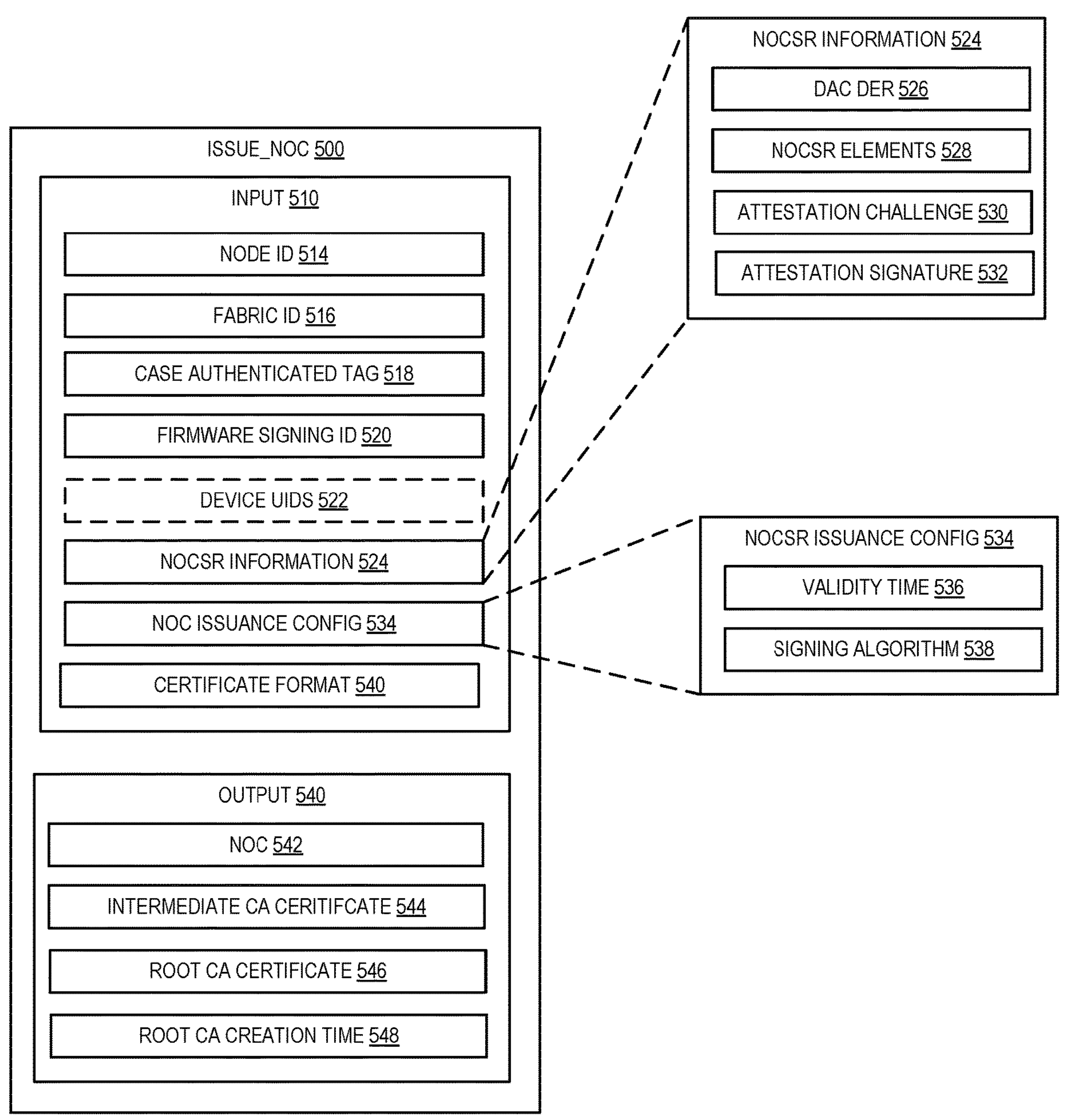
FIG. 5 illustrates an example of issue node operational certificate application program interface offered by a device commissioning service.

FIG. 5 depicts a block diagram of the ISSUE NOC API, as previously discussed. The input 520 comprises several components:

- Node ID 514: A numerical identifier chosen by the accessory device 104.
- Fabric ID 516: An identifier representing the network 102's fabric that the accessory device 104 aims to join. In some instances, the administrator 108 selects the fabric ID 518.
- CASE Authenticated Tag 518: A CASE authenticated tag associated with the accessory device 108.
- Firmware Signing ID 520: Identifies a digital certificate used for firmware signing.
- Set of Device UIDs 522: An optional collection of hardware IDs that uniquely identify the accessory device 108. For example, a device UID might be the MAC address of the accessory device 108. The device commissioning service 132 can employ this set for IoT device counterfeit detection, as explained in more detail below.

These components provide necessary information for the issuance of a node operational certificate (NOC) and are used by the device commissioning service 132 to facilitate the process.

The NOC signing request information 524 consists of the following components:

- DAC in DER format 526: This is used for validating the NOC signing request and is signed using the private key of the DAC. Additionally, the device commissioning service 132 can employ the DAC 526 for IoT device counterfeit detection, as explained in more detail later.
- Set of NOC signing request elements 528: These contain the NOC signing request and a nonce.
- Attestation challenge 530: This is generated by the administrator 108 during the establishment of the network session with the accessory device 104.
- Attestation signature 532: A digital signature of the NOC signing request elements 528 and the attestation challenge 530, signed by the accessory device 104 using the private key of the DAC.

These components are crucial for the issuance of the node operational certificate (NOC) and help ensure the security and integrity of the process.

The NOC issuance configuration 534 comprises the following parameters:

- Validity time (536): This parameter specifies how long the NOC to be issued will remain valid. The validity time can range from one day to two years, for example. To ensure proper issuance, the device commissioning service 132, working in conjunction with the private CA service 136, can ensure that the ICACERT used for issuing (signing) the NOC has a validity period that is at least as long as the specified validity time (536).
- Signing algorithm (538): This parameter dictates the digital signature algorithm to be employed for signing the NOC, such as EDSA with SHA256 or any other appropriately secure algorithm.

These parameters play a crucial role in configuring and securing the issuance of the node operational certificate (NOC).

The certificate format 450 specifies the output format of the NOC, the ICACERT, and the RCACERT that form the certificate chain of the accessory device 104. For example, the certificate format 450 could specify PEM, DER, TLV, or other suitable digital certificate data serialization format.

The output 540 of API 500 consists of the following components:

- NOC (542): This is the node operational certificate issued for the accessory device 104.
- ICACERT (544): This certificate was utilized to issue the NOC 542.
- RCACERT (546): This certificate was used to issue the ICACERT 544.

In some scenarios, the device commissioning service 132, in collaboration with the private CA service 136, may undergo RCACERT rotation. This rotation can occur for various reasons, such as the imminent expiration or revocation of the existing RCACERT used by IoT device 104 within the network 102. When this happens, all NOCs issued to IoT devices 104 within the network fabric can be reissued under a new RCACERT. The administrator device 108 can utilize the ISSUE_NOC API to reissue NOCs for IoT devices 104 under the new RCACERT.

For instance, if the administrator device 108 detects that the new RCACERT does not match the currently used RCACERT serving as the root of trust for the network fabric, it can request IoT devices 104 within the fabric to generate new NOC signing requests. These new signing requests are then provided in ISSUE_NOC API requests sent to the device commissioning service 132 to obtain fresh NOCs under the new RCACERT, along with new ICACERTs for the IoT devices 104.

It's worth noting that the device commissioning service 132, in collaboration with the private CA service 136, manages the timely rotation of the RCACERT, thereby relieving IoT device vendors of this responsibility. The root certificate authority creation timestamp 548 indicates the timestamp of when the RCACERT 546 was created. This timestamp can be employed by the administrator 108 to ascertain whether the RCACERT has been rotated by the device commissioning service 132 in partnership with the private CA service 136.

Counterfeit Device Detection

In some scenarios, the device commissioning service 132 includes a counterfeit detection mechanism as part of the device attestation verification and validation procedure. The objective of this mechanism is to identify counterfeit devices during the attestation process. Theoretically, it is possible for a malicious actor to create counterfeit devices by copying the firmware of a genuine accessory device 104. This copied firmware would include both the device's DAC and its associated private key. Subsequently, the malicious actor might attempt to sell these counterfeit accessory devices in the market, falsely claiming that they are certified devices, such as Matter certified devices.

To address this threat, the device commissioning service 132 is equipped to detect counterfeit IoT devices.

One way device commissioning service 132 can detect counterfeit IoT devices is to count the number of times the same DAC is provided in a GET_DEVICE_ATTESTATION_STATUS API request within a period of time. In the routine scenario, an IoT device will undergo the commissioning process at initial setup once or only a few times until the commissioning process is successful and then infrequently or never again thereafter. Thus, it would be unexpected to receive hundreds or thousands of GET_DEVICE_ATTESTATION_STATUS API requests providing the same DAC on the same day or even during the same week and possibly even the same month. Such a high number of requests indicates that a vendor's IoT device product has been counterfeited. In this case, the device commissioning service 132 can track the number of times a DAC is used in the device commissioning process during a window of time and if the number of times exceeds a threshold, alert the vendor corresponding to the vendor ID of the DAC that one of their products may have been counterfeited and the counterfeits are being used in the market.

Device commissioning service 132 can determine whether DACs used in the device commissioning process are the same DACs in various different ways including in any one of or a combination of two or more of the following ways: by comparing the public keys of the DACs to determine if they are identical, by comparing the serial numbers of the DACs to determine if they are identical, by computing cryptographic hash values (e.g., SHA-256) or thumbprints of the DACs and determining whether the hash values or thumbprints are identical, or by any other suitable digital certificate comparison technique.

Another way device commissioning service 132 can detect counterfeit IoT devices is by using the set of device UIDs 522 provided in the ISSUE_NOC API request. Each IoT device should have a unique DAC. Thus, the set of device UIDs 522 that identify hardware components of an IoT device such as a MAC address of the IoT device should not change much if at all. Therefore, the device commissioning service 132 can track the set of device UIDs 522 provided in ISSUE_NOC API requests for a given DAC. For each such API request, the set of device UIDs 522 should be the same or substantially the same if the NOC is being issued for the same IoT device. If there is substantial variance among the sets of device UIDs 552 provided in multiple ISSUE_NOC API requests, then this indicates that the same DAC and private key is being used by different IoT devices with different hardware components which is indicative of counterfeiting.

In some examples, the provider network 130 may be divided into regions. A region is a geographical area where the provider network 130 has established data centers to host its cloud infrastructure and services. The regions are completely isolated from each other in terms of infrastructure, which means that resources and services within one region are separate from those in another region. In some examples, there is a separate device commissioning service 132 in each of multiple regions of the provider network 130. In the non-counterfeit case, an IoT device 104 would be commissioned using the device commissioning service 132 of the provider network 130 in one region. For example, the administrator 108 can send the API requests to the device commissioning service 132 of the provider network 130 that is geographically closest to it. Thus, the provider network 130 can track cross-region use of a given DAC. If the same DAC is used in multiple regions, then there is a higher probability that the vendor's device has been counterfeited and sold into market into multiple regions.

Provider Network

The configuration presented in FIG. 1 encompasses a provider network denoted as "provider network 130." This network, often referred to as a "cloud" provider network, extends users the capability to leverage a diverse range of computing-related resources. These resources encompass compute elements, such as the execution of virtual machine (VM) instances or containers, undertaking batch jobs, and running code sans the need for server provisioning. Additionally, data and storage resources are encompassed, comprising object storage, block-level storage, archival data storage, databases, and database tables, among others. Network-related assets, like the setup of virtual networks that encompass clusters of compute resources, content delivery networks (CDNs), and Domain Name Service (DNS), are also part of this network. Application resources such as databases and services for application building and deployment are integral components. The network includes provisions for access policies, roles, identity policies, machine images, routers, and various other data processing resources, forming a comprehensive suite of capabilities offered to users.

These computing resources, among others, are available through provider network 130 as services such as device commissioning service 132, private CA service 136, and other service(s) 140. For instance, this includes a hardware virtualization service capable of executing compute instances and a storage service designed to store data objects. The individuals utilizing provider network 130, often referred to as "users" or "customers," can make use of one or more user accounts that are linked to a customer account. Although these terms may be used interchangeably depending on the context, they collectively represent the association between users and the provider network. Users can engage with provider network 130 through intermediary networks 102, which could be the internet, utilizing diverse interfaces. These interfaces encompass interacting via application programming interface (API) calls or utilizing a console implemented as a website or application, among other methods.

An API, short for Application Programming Interface, denotes an interface or communication protocol that facilitates interaction between a client and a server. When a client submits a request in a predetermined format, it anticipates receiving a response in a specific format or instigating a predefined action. Within the context of provider network 130, APIs serve as gateways enabling customers to access the infrastructure and resources within the network. This access empowers customers to retrieve data from or initiate actions within provider network 130, fostering the creation of applications that engage with the resources and services hosted within the network. APIs additionally facilitate the exchange of data among various services within provider network 130. These APIs can constitute an integral component of, or operate as a front-end for, the control plane of provider network 130. This control plane comprises "back-end" services that provide support and enable the more direct delivery of services to customers.

By way of illustration, provider network 130 typically alludes to an extensive repository of accessible virtualized computing resources, encompassing compute, storage, networking resources, applications, and services. Provider network 130 facilitates streamlined, on-demand network entry to a shared pool of configurable computing resources. These resources can be programmatically allocated and released based on customer directives. The flexibility of these resources enables them to be dynamically provisioned and reconfigured to accommodate fluctuating workloads. In this manner, provider network 130 can be perceived as encompassing both applications delivered as services over publicly accessible networks (e.g., the Internet, cellular communication networks) and the hardware and software situated within data centers, facilitating the delivery of said services.

Provider network 130 can be structured into multiple regions, where each region designates a geographical area containing a collection of data centers grouped by the cloud provider. Within each region, there are several availability zones (AZs), often numbering two or more, interconnected through a private high-speed network like fiber-optic communication connections. An availability zone, also recognized as a "zone," constitutes an isolated domain for handling failures, encompassing one or more data center facilities. These facilities possess independent power, networking, and cooling mechanisms distinct from those in other AZs. The term "data center" refers to a physical structure or enclosure housing servers of provider network 130 while providing essential power and cooling. In a region, the positioning of AZs is deliberately spread out, ensuring that the impact of a natural disaster or other failure-causing event does not affect more than one AZ concurrently or disrupt their operations.

Users can establish connections to an availability zone (AZ) within provider network 130 through publicly accessible networks such as the Internet or cellular communication networks. This connectivity is facilitated, for instance, via transit centers (TCs). TCs function as crucial backbone locations that bridge users and provider network 130. These TCs can be strategically positioned at other network provider facilities, such as those managed by Internet service providers (ISPs) or telecommunications providers. They are securely linked through methods like virtual private networks (VPNs) or direct connections to the AZs. Redundancy is upheld through the operation of two or more TCs within each region.

Regions are interconnected via a global network, incorporating private networking infrastructure, often involving fiber connections overseen by provider network 130. This network establishes connections between every region and at least one other region. Additionally, provider network 130 is capable of distributing content from external points of presence (POPs), connected with these regions, using edge locations and regional edge cache servers. Through this organization and geographic dispersion of computing hardware, provider network 130 effectively furnishes users worldwide with low-latency access to resources, maintaining a robust level of fault tolerance and stability.

To deliver these and other computing resource services, provider network 130 can rely on virtualization techniques. For instance, virtualization technologies enable users to manage and utilize compute resources. This includes entities like a compute instance, such as a virtual machine (VM) equipped with a guest operating system (O/S) functioning through a hypervisor. The hypervisor might operate independently or on top of an underlying host O/S. Alternately, a container can be employed, possibly functioning within a VM. Additionally, a compute instance capable of operating on bare metal hardware without an underlying hypervisor can also be utilized. Such configurations can be established using a single electronic device.

As a result, a user gains the direct ability to utilize a compute resource hosted by provider network 130 (e.g., provided by a hardware virtualization service) for a diverse range of computational tasks. Furthermore, it is possible for a user to indirectly leverage a compute resource by submitting code intended for execution by provider network 130 (e.g., using an on-demand code execution service). Provider network 130 subsequently employs one or more compute resources to execute the code, generally without requiring the user to possess control over or insight into the underlying compute instance(s) involved.

Provider network 130 may offer a service known as a "managed compute service," which operates code execution or furnishes computing resources to users in a supervised setup. Instances of managed compute services encompass diverse options such as an on-demand code execution service, a hardware virtualization service, a container service, and similar alternatives.

An on-demand code execution service (sometimes referred to as a function compute service, functions service, cloud functions service, functions-as-a-service, or serverless computing service) empowers users within provider network 130 to run their code on cloud resources without the necessity to individually select or oversee the underlying hardware resources responsible for executing the code. For instance, a user can engage an on-demand code execution service by uploading their code and utilizing one or more APIs to request the service to detect, allocate, and administer any necessary resources for code execution. Consequently, in various scenarios, a "serverless" function encompasses code sourced from a user or another entity—potentially including provider network 130 itself—and can be executed as needed.

Serverless functions can be managed within provider network 130 through an on-demand code execution service and may be associated with specific users or accounts or made accessible to multiple users/accounts. These functions are often linked with a Uniform Resource Locator (URL), Uniform Resource Identifier (URI), or another reference, which can be utilized to trigger the execution of the serverless function. Execution of a serverless function takes place when it is invoked, with a compute resource like a virtual machine, container, etc., being engaged.

In certain instances, invoking a serverless function can be accomplished through an API call or a specially formatted HyperText Transfer Protocol (HTTP) request message. Consequently, users can define serverless functions that are executed on demand, without necessitating the creation and maintenance of dedicated infrastructure for their execution. Instead, these functions are executed as needed, drawing on resources managed by provider network 130. In some scenarios, these resources can be held in a "ready" state, preconfigured with a runtime environment optimized for executing serverless functions. This approach enables the execution of serverless functions almost instantly in near real-time.

A hardware virtualization service (known as an elastic compute service, virtual machines service, computing cloud service, compute engine, or cloud compute service in various implementations) empowers users within provider network 130 to allocate and oversee compute resources, including virtual machine instances. This virtual machine technology permits the consolidation of multiple servers onto a single physical server, wherein each consolidated server is referred to as a virtual machine. This process is typically facilitated by a hypervisor, which may partly execute on an offload card within the server, such as a card connected via PCI or PCIe to the physical CPUs. Various components of the virtualization host can handle different virtualization management functions. The offload card may incorporate one or more CPUs that are specifically allocated to instance management tasks, such as overseeing virtual machine management (e.g., the hypervisor), input/output virtualization for network-attached storage volumes, local migration management, instance health monitoring, and similar responsibilities.

Virtual machines are often termed compute instances or simply "instances." In the context described, provisioning a virtual compute instance entails reserving resources (such as computational and memory resources) from an underlying physical compute instance for the client. This involves selecting from a pool of available physical compute instances and other resources, installing or launching the necessary software (e.g., an operating system), and subsequently making the virtual compute instance accessible to the client for carrying out tasks specified by the client.

Another form of managed compute service encompasses a container service, specifically a container orchestration and management service. This type of service (known as a container service, cloud container service, container engine, or container cloud service in various implementations) empowers users within provider network 130 to create and oversee containers. In certain scenarios, this container service can manifest as a KUBERNETES-based container orchestration and management service.

In the context of this document, a container encapsulates code and its associated dependencies, facilitating the swift and dependable execution of an application, which can also be referred to as a task, pod, or cluster across different computing environments. A container image stands as an independent, executable software package encompassing everything essential for initiating an application process: code, runtime, system tools, system libraries, and configurations. At runtime, container images transform into functional containers. Essentially, containers serve as an abstraction at the application layer, implying that each container emulates a distinct software application process. Although each container operates discrete processes, multiple containers can share a common operating system, which can be achieved by launching them within the same virtual machine.

In contrast, virtual machines operate as abstractions at the hardware layer, signifying that each virtual machine simulates a physical machine capable of running software. While multiple virtual machines can coexist on a single physical machine, each virtual machine usually possesses its own instance of an operating system, along with the corresponding applications, files, libraries, and dependencies.

Certain containers can operate on instances equipped with a container agent, while others can be executed on bare-metal servers or on an offload card within a server.

Example Provider Network Environment

Figure 6:
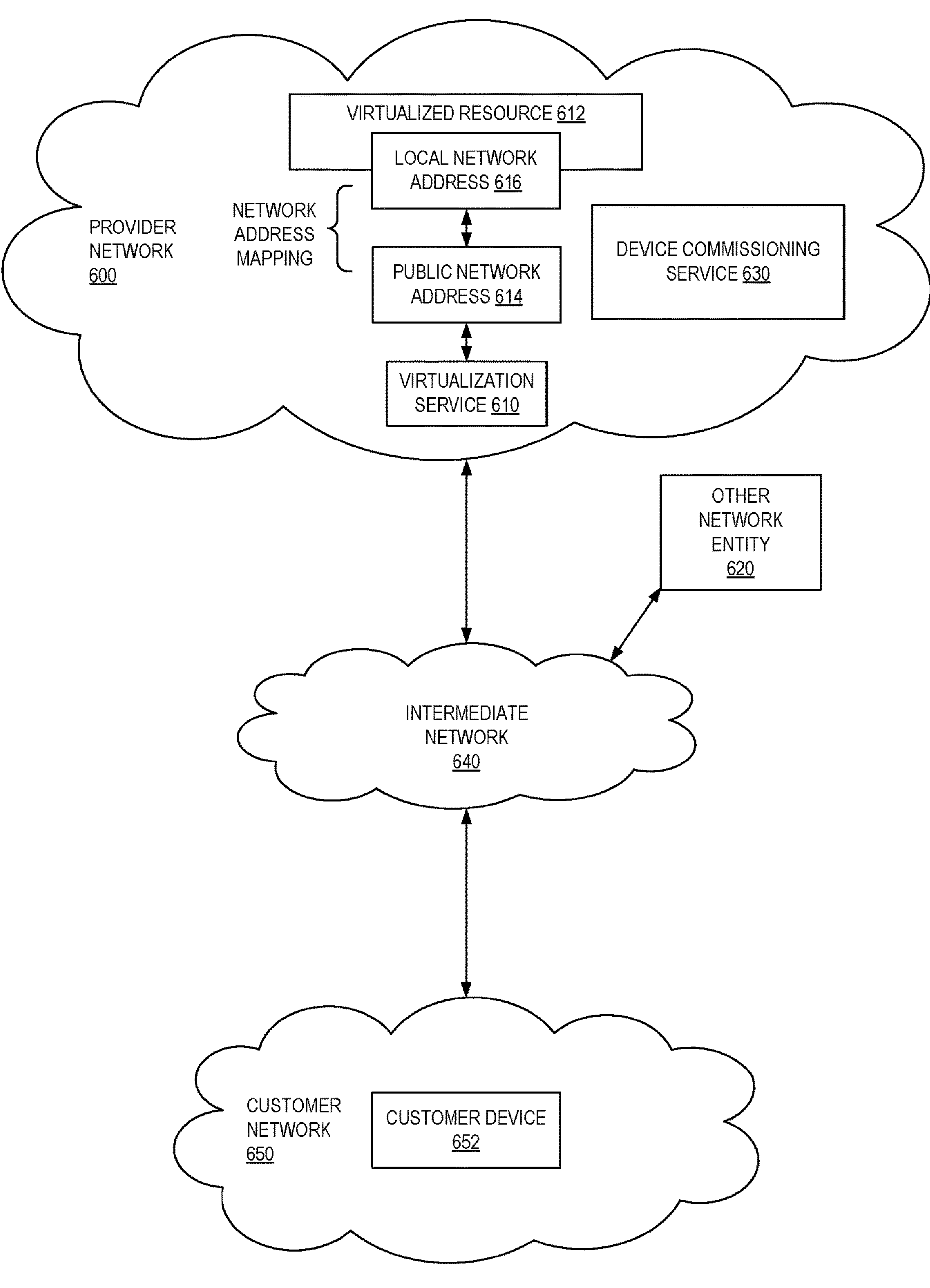
FIG. 6 illustrates an example of a provider network environment in which techniques for a device commissioning service are used.

FIG. 6 illustrates an example of a provider network environment in which the techniques for a device commissioning service are used. Provider network 600 encompasses the infrastructure and architecture established by a cloud service provider to deliver cloud services and virtualized resources to customers. Provider network 600 may be distributed over multiple data centers in different geographic regions. Each data center houses the physical hardware and servers that host the virtualized resources, applications, and services provided by the cloud service provider. The purpose of provider network 600 is to enable customers to access and utilize cloud-based services, applications, and virtualized resources over the internet from their customer networks (e.g., customer network 650) and using their computing devices (e.g., customer device 652) securely and efficiently. While only one customer network and one customer device are depicted in FIG. 6 for the purpose of providing a clear example, provider network 600 may be accessed by many customer networks and many customer devices.

In addition to providing a device commissioning service 630, provider network 600 provides virtualization service 610 that allows customers to use virtualized resources (e.g., virtualized resource 612) in provider network 600. While only a single virtualized resource is depicted in FIG. 6 for the sake of providing a clear example, provider network 600 may encompass many virtualized resources. Thus, virtualized resource 612 generically represents one of potentially many virtualized resources in provider network 600. Virtualized resource 612 can be one of various different types of virtualized resources that may exist in provider network 600 including, for example, a virtual machine, a container, a virtual router, a virtual switch, a virtual load balancer, a virtual firewall, a virtual network interface, a virtual network service, or any other suitable type of virtualized resource.

Figure 7:
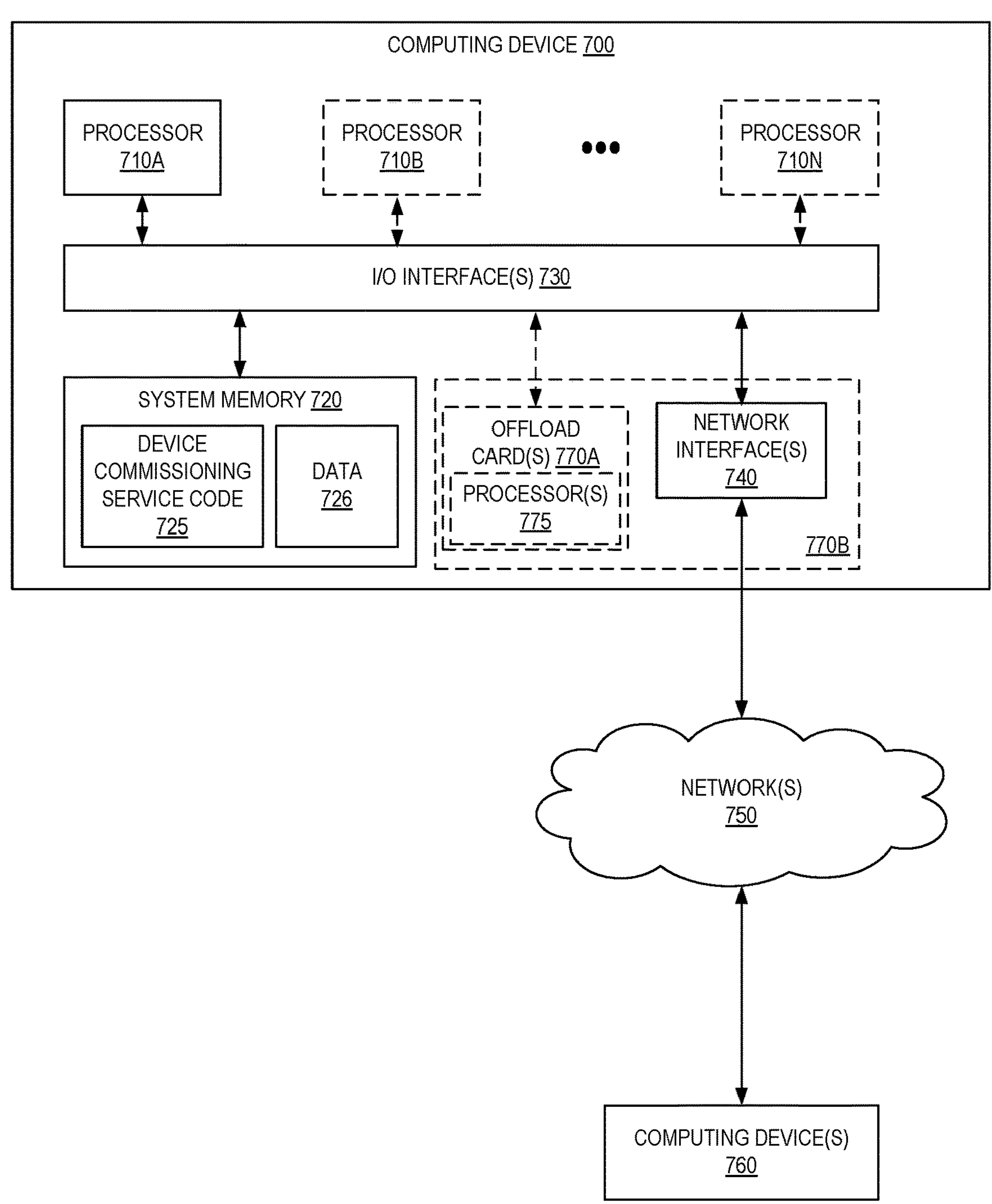
FIG. 7 illustrates an example of a computing device used to implement techniques for a device commissioning service.

Virtualization service 610 allows multiple virtualized resources (e.g., virtualized resource 612), such as operating systems, servers, storage, or networks, to run on a single physical hardware platform (e.g., computing device 700 of FIG. 7). Virtualization service 610 may use various technologies to accomplish virtualization including any or all of: a hypervisor or a virtual machine monitor or other software or firmware that creates and manages virtual machines, a virtual machine or other emulation of a physical computer that is capable of running its own operating system and applications independently from a host system and other virtual machines on the same hardware, a host system or a physical server or computer that runs the hypervisor/virtual machine monitor and host virtual machines, guest operating systems installed on each virtual machine that behave as if they were running on a dedicated physical machine, or other suitable virtualization technology.

By implementing virtualization via virtualization service 610, provider network 600 provides several benefits to customers and the cloud service provider. Virtualization allows better utilization of underlying hardware resources by running multiple virtual machines on a single physical server resulting in cost savings and more efficient use of computing power. Each virtual machine is isolated from others to a degree, providing security and fault tolerance such that if a virtual machine crashes or experiences an issue, it does not affect other virtual machines on the same host system. Virtualization allows easy creation, deletion, and migration of virtual machines, enabling greater flexibility and scalability in managing the provider network environment. Virtualization enables rapid software testing and development, as it allows developers to create multiple environments quickly and without the need for separate physical hardware.

Additionally or alternatively, virtualization provided by virtualization service 610 encompasses containerization technologies. Containerization is a form of virtualization that allows software applications and their dependencies to be packaged and isolated into self-container units called containers. Each container includes the application, runtime, libraries, and other necessary components, ensuring that the application runs consistently and reliably across different environments. Containerization provides a lightweight, portable, and scalable solution for deploying and managing software applications. Containers share the host system's operating system kernel, which makes them more efficient than virtual machines that require separate guest operating systems. This allows containers to start and stop quickly, using fewer resources, and scale easily.

Provider network 600 uses public network addresses (e.g., public network address 614) and local IP addresses (e.g., local network address 614) to provide virtualized resources to customers. Provider network 600, via virtualization services 610, allows public network address 614 and local network address 616 to be associated with virtualized resource 612 provisioned to a customer. Public network address 614 may be one of many public network addresses used by provider network 600. Likewise for local network address 616. Thus, public network address 614 and local network address 616 generically represent a public network address and local network address respectively used by provider network 600 to provide a virtualized resource. Both public network address 614 and local network address 614 may be an internet protocol (IP) network address such as, for example, an IPv4 or IPv6 network address. Local network address 616 can be a private network address within an address block reserved by Internet Engineering Task Force (IETF) Request for Comments (RFC) 1918 or of an address format specified by IETF RFC 4193 or other type of private network address.

Using resource 612 and public network address 614, a customer can implement a customer-specific application and present the application on intermediate network 640 (e.g., the internet). Network traffic originating outside provider network 600 is not directly routed to local network address 616. Instead, the network traffic uses public network address 614 that is mapped to local IP address 616. Provider network 600 can include a networking device or appliance that provides network address translation (NAT) or similar functionality to perform forward mapping from public IP address 614 to local IP address 616. Another network entity 620 on intermediate network 640 can generate network traffic (e.g., internet protocol (IP) packets) to public network address 614. The network traffic destined for public network address 614 is routed via intermediate network 640 to provider network 600. The received network traffic is routed within provider network 600 to local network address 616 and to virtualized resource 612 that processes the network traffic. Network traffic generated by virtualized resource 612 may be routed onto intermediate network 640 to network entity 620.

Example Computing Device

FIG. 7 illustrates an example of a computing device used to implement techniques for a device commissioning service. In some examples, a system that implements a portion or all of the techniques described herein can include a general-purpose computer system, such as the computing device 700 (also referred to as a computing system or electronic device) illustrated in FIG. 7, that includes, or is configured to access, one or more computer-accessible media. In the illustrated example, the computing device 700 includes one or more processors 710 coupled to a system memory 720 via an input/output (I/O) interface 730. The computing device 700 further includes a network interface 740 coupled to the I/O interface 730. While FIG. 7 shows the computing device 700 as a single computing device, in various examples the computing device 700 can include one computing device or any number of computing devices configured to work together as a single computing device 700.

In various examples, the computing device 700 can be a uniprocessor system including one processor 710, or a multiprocessor system including several processors 710 (e.g., two, four, eight, or another suitable number). The processor(s) 710 can be any suitable processor(s) capable of executing instructions. For example, in various examples, the processor(s) 710 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 710 can commonly, but not necessarily, implement the same ISA.

The system memory 720 can store instructions and data accessible by the processor(s) 710. In various examples, the system memory 720 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 720 as service code 725 (e.g., executable to implement, in whole or in part, device commissioning service 132 of FIG. 1) and data 726.

In some examples, the I/O interface 730 can be configured to coordinate I/O traffic between the processor 710, the system memory 720, and any peripheral devices in the device, including the network interface 740 and/or other peripheral interfaces (not shown). In some examples, the I/O interface 730 can perform any necessary protocol, timing, or other data transformations to convert data signals from one component (e.g., the system memory 720) into a format suitable for use by another component (e.g., the processor 710). In some examples, the I/O interface 730 can include support for devices attached through various types of peripheral buses, such as a variant of the Peripheral Component Interconnect (PCI) bus standard or the Universal Serial Bus (USB) standard, for example. In some examples, the function of the I/O interface 730 can be split into two or more separate components, such as a north bridge and a south bridge, for example. Also, in some examples, some or all of the functionality of the I/O interface 730, such as an interface to the system memory 720, can be incorporated directly into the processor 710.

The network interface 740 can be configured to allow data to be exchanged between the computing device 700 and other computing devices 760 attached to a network or networks 750, such as other computer systems or devices as illustrated in FIG. 1, for example. In various examples, the network interface 740 can support communication via any suitable wired or wireless general data networks, such as types of Ethernet network, for example. Additionally, the network interface 740 can support communication via telecommunications/telephony networks, such as analog voice networks or digital fiber communications networks, via storage area networks (SANs), such as Fibre Channel SANs, and/or via any other suitable type of network and/or protocol.

In some examples, the computing device 700 includes one or more offload cards 770A or 770B (including one or more processors 775, and possibly including the one or more network interfaces 740) that are connected using the I/O interface 730 (e.g., a bus implementing a version of the Peripheral Component Interconnect—Express (PCI-E) standard, or another interconnect such as a QuickPath interconnect (QPI) or UltraPath interconnect (UPI)). For example, in some examples the computing device 700 can act as a host electronic device (e.g., operating as part of a hardware virtualization service) that hosts compute resources such as compute instances, and the one or more offload cards 770A or 770B execute a virtualization manager that can manage compute instances that execute on the host electronic device. As an example, in some examples the offload card(s) 770A or 770B can perform compute instance management operations, such as pausing and/or un-pausing compute instances, launching and/or terminating compute instances, performing memory transfer/copying operations, etc. These management operations can, in some examples, be performed by the offload card(s) 770A or 770B in coordination with a hypervisor (e.g., upon a request from a hypervisor) that is executed by the other processors 710A-910N of the computing device 700. However, in some examples the virtualization manager implemented by the offload card(s) 770A or 770B can accommodate requests from other entities (e.g., from compute instances themselves), and cannot coordinate with (or service) any separate hypervisor.

In some examples, the system memory 720 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computing device 700 via the I/O interface 730. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computing device 700 as the system memory 720 or another type of memory. Further, a computer-accessible medium can include transmission media or signals such as electrical, electromagnetic, or digital signals, conveyed via a communication medium such as a network and/or a wireless link, such as can be implemented via the network interface 740.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

Terminology

In the previous description, numerous examples have been detailed. To facilitate comprehension, particular configurations and specifics have been presented to offer a comprehensive grasp of the examples. Nevertheless, it will be evident to a skilled practitioner in the field that these examples can be implemented even in the absence of these precise details. Additionally, commonly recognized features may be excluded or streamlined to avoid obscuring the essence of the described example.

Bracketed text and sections outlined by dashed borders (e.g., using large dashes, small dashes, dot-dash, and dots) are employed here to depict optional elements that contribute supplementary features to specific examples. Nonetheless, this notation shouldn't be construed as an indication that these are the sole choices or optional processes available, or that sections outlined by solid borders are non-optional in particular instances.

Reference numerals supplemented with suffix identifiers serve to denote that there could be one or multiple occurrences of the cited entity in different examples. In cases where multiple instances arise, it's important to note that these instances need not be identical but may instead share certain general attributes or exhibit common behavior. Additionally, the specific suffixes employed are not indicative of a particular quantity of entities unless explicitly stated otherwise. Consequently, when two entities are denoted with the same or distinct suffix letters, the presence of the same number of instances in various examples may or may not hold true.

Instances where phrases like "one example," "an example," "in some examples," "in certain instances," and the like are used, signify that the delineated example might encompass a specific feature, structure, or attribute. However, it should be noted that not every example is obliged to incorporate this specific aspect. Additionally, these phrases don't necessarily pertain to identical examples. Furthermore, when a particular feature, structure, or characteristic is elucidated in conjunction with an example, it's understood that those skilled in the field can apply such an element in relation to other examples, regardless of whether it's expressly mentioned.

Furthermore, across the assorted examples outlined above, unless explicitly indicated otherwise, language that presents options, such as the expression "at least one of A, B, or C," is intended to encompass A, B, or C independently, or any potential combination thereof (e.g., A, B, and/or C). In a similar vein, language like "at least one or more of A, B, and C" (or "one or more of A, B, and C") is intended to signify A, B, or C separately, or any conceivable combination thereof (e.g., A, B, and/or C). Hence, the intention behind disjunctive language is neither to imply nor should it be construed as implying that a given example necessitates the presence of at least one of A, at least one of B, and at least one of C, all simultaneously.

In the context of this document, the term "based on" (or similar phrases) is an expansive term employed to characterize one or more elements that influence a determination or other form of action. It's crucial to recognize that this term does not preclude the involvement of additional factors that might also impact a decision or action. For instance, a determination might be solely influenced by the listed factor (s), or it could be guided by the factor(s) in conjunction with one or multiple supplementary factors. Therefore, when an action, denoted as A, is stated to be "based on" B, it indicates that B is a contributing factor to the influence on action A. However, this doesn't discount the possibility that the action may also draw influence from one or more other factors, such as factor C. Nevertheless, in certain scenarios, action A might indeed be exclusively influenced by B.

Unless expressly specified otherwise, articles such as "a" or "an" should typically be understood to encompass one or multiple of the described entities. Consequently, expressions like "a device configured to" or "a computing device" are intended to encompass one or multiple of the devices mentioned. These one or more devices that are mentioned can collectively be arranged to execute the actions detailed. For instance, the phrase "a processor configured to perform operations A, B, and C" can encompass a first processor configured for operation A in tandem with a second processor configured to perform operations B and C.

Additionally, the terms "may" or "can" are employed in a permissive context, signifying potential capability, rather than being mandatory in nature. The terms "include," "including," and "includes" are utilized to signify broad-ranging relationships, thereby encompassing, but not limited to, the items mentioned. Similarly, the terms "have," "having," and "has" also denote open-ended relationships, suggesting possession, but not being limited to it.

The designations "first," "second," "third," and so forth, as employed in this context, serve as labels for the nouns they precede. These labels do not infer any particular order (e.g., spatial, temporal, logical, etc.), unless explicitly indicated otherwise. Similarly, the numerical values of such labels generally do not signify a stipulated quantity of a specific noun within the claims articulated herein. Therefore, a "fifth" element usually does not imply the presence of four other elements, unless these elements are explicitly referenced in the claim or it is expressly made evident that they exist.

Therefore, the specification and drawings are intended to be perceived in an illustrative capacity rather than a confining one. It will be apparent, though, that numerous modifications and adjustments can be introduced without straying from the broader ambit of the disclosure as delineated in the claims.

What is claimed is:

1. A computer-implemented method performed by one or more computing devices, the method comprising:

receiving, at a device commissioning service in a provider network, a request to get a device attestation status, the request to get the device attestation status comprising attestation information for an internet-of-things (IoT) device on an IoT network, wherein the request is sent by an administrator device on the IoT network;

performing, by the device commissioning service, a device attestation validation procedure to determine a device attestation status for the IoT device, wherein the device commissioning service performs the device attestation validation procedure based at least in part on the attestation information, and wherein the device attestation validation procedure includes:

obtaining, by the device commissioning service, a product attestation authority (PAA) root digital certificate from a distributed compliance ledger observer node of one or more distributed compliance ledger observer nodes in the provider network; and determining, by the device commissioning service, the device attestation status for the IoT device based at least in part on the device commissioning service determining that the PAA root digital certificate has not been revoked;

sending, by the device commissioning service, the device attestation status, wherein the device attestation status is received by the administrator device;

receiving, at the device commissioning service, a request to issue a node operational digital certificate for the IoT device, wherein the request to issue the node operational digital certificate for the IoT device is sent by the administrator device;

issuing the node operational digital certificate for the IoT device; and sending, by the device commissioning service, the node operational digital certificate, wherein the node operational digital certificate is received by the administrator device.

2. The computer-implemented method of claim 1, further comprising:

receiving, by the device commissioning service, a request to get a device model for the IoT device, wherein the request is sent from the administrator device;

obtaining, by the device commissioning service, device model information for the IoT device from a distributed compliance ledger observer node of one or more distributed compliance ledger observer nodes in the provider network; and sending, by the device commissioning service, the device model information, wherein the device model information is received by the administrator device.

3. The computer-implemented method of claim 1, wherein:

the attestation information comprises a device attestation certificate for the IoT device and a product attestation intermediate certificate;

performing the device attestation validation procedure by the device commissioning service further comprises the device commissioning service:

accessing a certificate revocation list cache in the provider network to verify that the device attestation certificate has not been revoked, accessing the certificate revocation list cache in the provider network to verify that the product attestation intermediate certificate has not been revoked, using a public key associated with the product attestation intermediate certificate to cryptographically verify a digital signature of the device attestation certificate, and using a public key associated with the product attestation authority root digital certificate to cryptographically verify a digital signature of the product attestation intermediate certificate.

4. The computer-implemented method of claim 1, wherein:

the attestation information comprises a device attestation certificate for the IoT device; and the method further comprises detecting a possible device counterfeiting based at least in part on counting, by the device commissioning service, a number of times within a period of time the device attestation certificate is used for device commissioning.

5. The computer-implemented method of claim 1, wherein:

the attestation information comprises a device attestation certificate for the IoT device and a first set of one or more identifiers of a first set of one or more hardware components of the IoT device; and the method further comprises detecting a possible device counterfeiting based at least in part on determining, by the device commissioning service, whether the first set of one or more identifiers of the first set of the one or more hardware components of the IoT device is different from a second set of one or more previously received identifiers of a second set of one or more hardware components of the IoT device.

6. The computer-implemented method of claim 1, wherein:

the provider network is divided into a plurality of regions;

the attestation information comprises a device attestation certificate for the IoT device;

the request to get the device attestation status is received at the device commissioning service in a first region of the plurality of regions; and the method further comprises detecting a possible device counterfeiting based at least in part on determining, by the device commissioning service, that a request to get a device attestation status comprising the device attestation certificate for the IoT device was received at a device commissioning service in a second region of the plurality of regions.

7. The computer-implemented method of claim 1, wherein:

the device commissioning service offers an application program interface (API) accepting an input and producing an output;

the input comprises a product identifier and a vendor identifier;

the output comprises a device model; and the method further comprises receiving an API request via the API.

8. The computer-implemented method of claim 1, wherein:

the device commissioning service offers an application program interface (API) accepting an input and producing an output;

the input comprises a vendor identifier, a product identifier, and attestation information;

the output comprises a device attestation status, a last revocation data retrieval time, and a revocation data status; and the request to get the device attestation status for the IoT device is received via the API.

9. The computer-implemented method of claim 1, wherein:

the device commissioning service offers an application program interface (API) accepting an input and producing an output;

the input comprises a node identifier, a fabric identifier, a node operational certificate signing request, and a device attestation certificate;

the output comprises a node operational certificate, an intermediate certificate authority certificate, and a root certificate authority certificate;

the request to issue the node operational digital certificate for the IoT device is received via the API.

10. The computer-implemented method of claim 1, wherein the node operational certificate is issued by a certificate authority service in the provider network.

11. A system comprising:

a first one or more computing devices to implement a device commissioning service in a provider network, the device commissioning service including instructions that upon execution cause the device commissioning service to:

receive a request to get a device attestation status, the request to get the device attestation status comprising attestation information for an internet-of-things (IoT) device on an IoT network, the attestation information comprising a device attestation certificate for the IoT device and a first set of one or more identifiers of a first set of one or more hardware components of the IoT device, wherein the request is to be sent by an administrator device on the IoT network;

detect a possible device counterfeiting based at least in part on determining whether the first set of one or more identifiers of the first set of the one or more hardware components of the IoT device is different from a second set of one or more previously received identifiers of a second set of one or more hardware components of the IoT device;

perform a device attestation validation procedure to determine a device attestation status for the IoT device, wherein the device commissioning service is to perform the device attestation validation procedure based at least in part on the attestation information;

send the device attestation status, wherein the device attestation status is to be received by the administrator device;

receive a request to issue a node operational digital certificate for the IoT device, wherein the request to issue the node operational digital certificate for the IoT device is to be sent by the administrator device;

send the node operational digital certificate, wherein the node operating digital certificate is to be received by the administrator device;

a second one or more computing devices to implement a certificate authority service in the provider network, the certificate authority service including instructions that upon execution cause the private certificate authority service to issue the node operational digital certificate for the IoT device.

12. The system of claim 11, wherein the device commissioning service further includes instructions that upon execution cause the device commissioning service to:

obtain a product attestation authority (PAA) root digital certificate from a distributed compliance ledger observer node of one or more distributed compliance ledger observer nodes in the provider network; and determine the device attestation status for the IoT Device based at least in part on the device commissioning service determining that the PPA root digital certificate has not been revoked.

13. The system of claim 11, wherein the device commissioning service further includes instructions that upon execution cause the device commissioning service to:

receive a request to get a device model for the IoT device, wherein the request is to be sent from the administrator device;

obtain device model information for the IoT device from a distributed compliance ledger observer node of one or more distributed compliance ledger observer nodes in the provider network; and send the device model information, wherein the device model information is to be received by the administrator device.

14. The system of claim 11, wherein:

the attestation information further comprises a product attestation intermediate certificate;

the instructions that upon execution cause the device commissioning service to perform the device attestation validation procedure comprise instructions that upon execution cause the device commissioning service to:

obtain a product attestation authority root digital certificate from a distributed compliance ledger observer node of one or more distributed compliance ledger observer nodes in the provider network, access a certificate revocation list cache in the provider network to verify that the device attestation certificate has not been revoked, access the certificate revocation list cache in the provider network to verify that the product attestation intermediate certificate has not been revoked, use a public key associated with the product attestation intermediate certificate to cryptographically verify a digital signature of the device attestation certificate, and use a public key associated with the product attestation authority root digital certificate to cryptographically verify a digital signature of the product attestation intermediate certificate.

15. The system of claim 11, wherein the device commissioning service further includes instructions that upon execution cause the device commissioning service to detect a possible device counterfeiting based at least in part on counting a number of times within a period of time the device attestation certificate is used for device commissioning.

16. The computer-implemented method performed by one or more computing devices, the method comprising:

receiving, at a device commissioning service in a provider network, a request to get a device attestation status, the request to get the device attestation status comprising attestation information for an internet-of-things (IoT) device on an IoT network, wherein the request is sent by an administrator device on the IoT network;

performing, by the device commissioning service, a device attestation validation procedure to determine a device attestation status for the IoT device, wherein the device commissioning service performs the device attestation validation procedure based at least in part on the attestation information;

sending, by the device commissioning service, the device attestation status, wherein the device attestation status is received by the administrator device;

receiving, at the device commissioning service, a request to issue a node operational digital certificate for the IoT device, wherein the request to issue the node operational digital certificate for the IoT device is sent by the administrator device;

issuing the node operational digital certificate for the IoT device;

sending, by the device commissioning service, the node operational digital certificate, wherein the node operational digital certificate is received by the administrator device;

receiving, by the device commissioning service, a request to get a device model for the IoT device, wherein the request is sent from the administrator device;

obtaining, by the device commissioning service, device model information for the IoT device from a distributed compliance ledger observer node of one or more distributed compliance ledger observer nodes in the provider network; and sending, by the device commissioning service, the device model information, wherein the device model information is received by the administrator device.

17. The computer-implemented method of claim 16, wherein:

the device commissioning service offers an application program interface (API) accepting an input and producing an output;

the input comprises a product identifier and a vendor identifier;

the output comprises a device model; and the method further comprises receiving an API request via the API.

18. The computer-implemented method of claim 16, wherein:

the device commissioning service offers an application program interface (API) accepting an input and producing an output;

the input comprises a vendor identifier, a product identifier, and attestation information;

the output comprises a device attestation status, a last revocation data retrieval time, and a revocation data status; and the request to get the device attestation status for the IoT device is received via the API.

19. The computer-implemented method of claim 16, wherein:

the device commissioning service offers an application program interface (API) accepting an input and producing an output;

the input comprises a node identifier, a fabric identifier, a node operational certificate signing request, and a device attestation certificate;

the output comprises a node operational certificate, an intermediate certificate authority certificate, and a root certificate authority certificate;

the request to issue the node operational digital certificate for the IoT device is received via the API.

20. The computer-implemented method of claim 16, wherein the node operational certificate is issued by a certificate authority service in the provider network.

* * * * *